(12) United States Patent
Kobayashi et al.

(10) Patent No.: US 7,547,206 B2
(45) Date of Patent: Jun. 16, 2009

(54) DOUGH PROCESSING APPARATUS

(75) Inventors: Masao Kobayashi, Fukui (JP); Hironori Kobayashi, Fukui (JP); Toru Fukiage, Fukui (JP)

(73) Assignee: Kobird Co., Ltd., Fukui-shi (JP)

( * ) Notice: Subject to any disclaimer, the term of this patent is extended or adjusted under 35 U.S.C. 154(b) by 694 days.

(21) Appl. No.: 11/366,607

(22) Filed: Mar. 2, 2006

(65) Prior Publication Data

US 2006/0222748 A1   Oct. 5, 2006

(30) Foreign Application Priority Data

| Mar. 30, 2005 | (JP) | ............................. 2005-099621 |
| Sep. 2, 2005 | (JP) | ............................. 2005-255763 |
| Sep. 14, 2005 | (JP) | ............................. 2005-266835 |
| Nov. 1, 2005 | (JP) | ............................. 2005-318901 |

(51) Int. Cl.
*A21C 11/00* (2006.01)

(52) U.S. Cl. ........................ 425/356; 99/353; 425/363; 425/374; 425/394

(58) Field of Classification Search ................ 425/356, 425/363, 366, 374, 394; 99/353
See application file for complete search history.

(56) References Cited

U.S. PATENT DOCUMENTS

| 4,690,043 A | * | 9/1987 | Pacilio | ........................ 99/353 |
| 5,204,125 A | * | 4/1993 | Larsen | ........................ 425/394 |
| 6,067,897 A | * | 5/2000 | Grieco | ........................ 99/353 |

FOREIGN PATENT DOCUMENTS

| EP | 015194 | * | 9/1980 |
| EP | 1 129 621 A1 | | 9/2001 |
| FR | 2768305 | * | 3/1999 |
| JP | 32-3040 | | 5/1957 |
| JP | 58-51833 | | 3/1983 |
| JP | 01-206942 | | 8/1989 |
| JP | 01-252266 | | 10/1989 |
| JP | 08-084553 | | 4/1996 |
| JP | 2554631 | | 7/1997 |

(Continued)

*Primary Examiner*—James Mackey
(74) *Attorney, Agent, or Firm*—Flynn, Thiel, Boutell & Tanis, P.C.

(57) ABSTRACT

It is an object of the present invention to provide a dough processing apparatus capable of not only stably thinning and shaping dough, such as a pizza dough, and so forth, into a thin sheet-like shape, but also coping with dough in a wide variety of shapes with ease. A rounded dough f obtained by portioning out dough to a predetermined quantity is transferred toward under a first beating mechanism, and a second beating mechanism by a belt conveyor. The first beating mechanism, and the second beating mechanism make the vertical movement, alternately, whereupon the dough f is pressed under pressure to be thereby thinned. The dough f after thinned is then transferred by the belt conveyor to be delivered to a dough-shaping apparatus. The dough f is transferred by a belt conveyor to be surrounded by a horizontal die. The dough f as surrounded by the horizontal die is pushed down from above by a rotator provided with a plurality of push-rollers. Upon rotation of the rotator, the dough f is thinned by the plurality of the push-rollers to be thereby shaped into a shaped dough F in the shape of a thin sheet, circular in a plan view.

5 Claims, 29 Drawing Sheets

FOREIGN PATENT DOCUMENTS

| | | |
|---|---|---|
| JP | 11-155466 | 6/1999 |
| JP | 11-243834 | 9/1999 |
| JP | 11-308961 | 11/1999 |
| JP | 11-318317 | 11/1999 |
| JP | 2001-061401 | 3/2001 |
| JP | 2003-333979 | 11/2003 |

* cited by examiner

DOUGH PROCESSING APPARATUS

FIELD OF THE INVENTION

The invention relates to a dough processing apparatus, and more particularly, to a dough processing apparatus suitable for thinning and shaping dough high in viscosity, such as a bread dough, pizza dough, and so on, into a thin sheet-like shape.

BACKGROUND OF THE INVENTION

An apparatus for spreading dough into a shape substantially circular has since been proposed, and for example, in Patent Document 1, there has been disclosed a spreading apparatus wherein a yeast-raised dough is shaped so as to have a predetermined thickness while being beaten between a backing roller rotating at a predetermined position, and a beating belt repeatedly making a motion to approach, and part from the backing roller to thereby degas the dough, and while the yeast-raised dough shaped to the predetermined thickness is transferred by a conveyor means, the yeast-raised dough is beaten to be spread by a beating member repeatedly making a motion to approach, and part from the yeast-raised dough, the dough, meanwhile, being degassed. Further, in Patent Document 2, there has been disclosed a spreading apparatus for spreading a bread dough, and so forth, comprising a rotator with a plurality of planetary rollers arranged so as to revolve along a circumferential locus of the rotator, and a transfer unit provided below the rotator, comprising a plurality of rollers whose circumferential speeds sequentially increase from an inlet of the transfer unit, for the dough, towards an outlet thereof, and a plate arc-like in shape, wherein the transfer unit, and the planetary rollers positioned above the transfer unit are disposed so as to oppose each other such that respective gaps with curvature between the plurality of the rollers of the transfer unit, and the planetary rollers positioned above the transfer unit, undergo gradual decrease from the inlet of the transfer unit, for the dough, towards the outlet thereof. Further, in Patent Document 3, there has been disclosed a food dough processing apparatus wherein a dough material is clamped between respective opposing faces of upper and lower endless belts, disposed above and below, so as to oppose each other, with a predetermined spacing interposed therebetween, thereby press-molding the dough material by a molding means while the upper and lower endless belts are intermittently run in the same direction in sync with each other.

Still further, as to an apparatus for thinning and shaping dough with the use of a roller, Patent Document 4 has disclosed a noodle lump spreading apparatus wherein a roller in a cone shape, for pushing and spreading a noodle lump, and a roller in a truncated cone shape, for allowing the noodle lump to be pushed thereto, attached to a slidably moving frame, are pressed into contact with a noodle lump housed in a rotating noodle lump container in the shape of a tray, and such a pushing and spreading operation can be automatically executed by making use of a mechanical power. Yet further, in Patent Document 5, there has been disclosed an apparatus capable of forming skins of Chinese dumplings, with a peripheral portion thereof, smaller in thickness, by clamping and pressing dough between a bottomed female die provided with a cavity circular in shape, and a male die made up of a cone with the base of a conical surface, substantially identical in radius to the cavity circular in shape. Further, in Patent Document 6, there has been disclosed a stamping apparatus wherein a plurality of die-pieces making up a horizontal die are caused to make an approach-motion so as to surround a skin material, and the skin material is then pressed from above by an upper die with a cavity formed on the underside central face thereof to thereby enable the skin material to be formed in the shape of a sheet with a center part larger in thickness than the peripheral part thereof. Yet further, in Patent Document 7, there has been disclosed a method whereby dough in a ball-like shape is clamped between two planes circular in shape to be then rotated, thereby producing a pizza dough in a disc shape by the agency of centrifugal force.

[Patent Document 1]
JP 2001-61401 A
[Patent Document 2]
JP 1999-308961 A
[Patent Document 3]
JP 2973313 B1
[Patent Document 4]
JP 1983-51833
[Patent Document 5]
JP 1989-252266
[Patent Document 6]
JP 3421667 B1
[Patent Document 7]
JP 1999-155466 A

SUMMARY OF THE INVENTION

In the case of beating dough into the shape of a circular thin sheet, such as a pizza dough, it is ideal to form dough as portioned out to have a predetermined quantity into a round shape to thereby roll the same in the radial direction from the center thereof. However, in practice, the dough formed in the round shape is generally rolled in two directions orthogonal to each other. Particularly, in the case of dough high in viscosity, such as the pizza dough, with rolling applied in one direction only, a reduction roller acts unevenly on the dough, so that rolled portions thereof undergo shrinkage when baked, resulting in collapsing of the shape of the dough.

FIG. 38 is a schematic representation showing an example of a conventional process for rolling dough in two directions orthogonal to each other. With this example, rolling is carried out by use of two reduction rollers 700, 701. The dough K1 portioned out to have the predetermined quantity to be then rounded is rolled by the reduction roller 700 so as to be spread in the direction of transfer thereof (dough K2), and is 90° turned by a direction-rotating conveyer (dough K3) before being rolled by the reduction roller 701 so as to be spread (dough K4). Thus, the dough K1 is rolled into the shape of the circular thin sheet by executing rolling in two directions orthogonal to each other with the use of the two reduction rollers.

FIG. 39 is a schematic representation showing another example of the conventional process. In the case of this example, rolling is executed with the use of rolling mechanisms 702, 703, each provided with a plurality of bar-like rolling members arranged in parallel with each other as described in Patent Document 1. With this example as well, dough K1 is rolled by the rolling mechanism 702 so as to be spread in the direction of transfer thereof (dough K2) to be subsequently transferred to a belt conveyer with the direction of transfer, turned by 90° (dough K3) before executing rolling by the rolling mechanism 703 so as to be rolled in two directions orthogonal to each other (dough K4).

As described above, with the conventional reduction rollers used in rolling and the conventional pressing mechanisms using the pressing members, in the case of thinning dough into the shape of the circular thin sheet, two units of devices are required to carry out rolling in two directions orthogonal to each other, and in addition, a transfer mechanism needs to be installed in order to turn the dough around. Hence, facilities for thinning become complex, so that an increase in space required, and burden on cost is unavoidable.

Further, thinning by pressing dough A in whole with a pressing plate at a time has been in practice, however, in this case, shrinkage occurring to the dough A after rolled is unavoidable, and the dough A is prone to collapse in shape.

In processing dough, besides thinning of the dough as described above, shaping of the dough is required.

With the noodle lump spreading apparatus disclosed in Patent Document 4, as previously described, advance of the noodle lump being pushed out of the noodle lump container in the shape of the tray is blocked by the roller for allowing the noodle lump to be pushed thereto to thereby push back the noodle lump toward the inner bottom of the noodle lump container, which serves only for the purpose of preventing portions of the noodle lump from lying off the noodle lump container, so that it is difficult to render the noodle lump as rolled into a circular shape with a well shaped peripheral edge. With the apparatus for forming the skins of Chinese dumplings, disclosed in Patent Document 5, no thought is given to contact between the female die, and the peripheral part of the cone, and there is the likelihood that without secure contact, portions of the dough come to lie off the dies, resulting in failure to shape the peripheral part of the skin of Chinese dumpling in good order. With the stamping apparatus disclosed in Patent Document 6, the skin material is formed by pressing the same from above by the upper die while restraining the peripheral part of the skin material by the horizontal die, so that excellent shaping of dough can be executed, however, the dough subjected to just pressing tends to revert to a shape at the outset, so that the dough is prone to collapse in shape with time. Further, there is a problem in that unless the skin material is in a shape substantially circular, shaping cannot be implemented with reliability. Further, with the method disclosed in Patent Document 7, since the dough is rotated by the agency of centrifugal force, there is the risk of the pizza dough being marred.

For example, the pizza dough includes dough in a wide variety of shapes, such as an Italian type dough small in thickness, a Neapolitan type dough with the periphery thereof, formed to a larger thickness, and so forth, however, it is difficult for those apparatuses or methods, described in Patent Documents referred to as above, to cope with processing for the dough in such a wide variety of shapes as above.

Accordingly, it is an object of the present invention to provide a dough processing apparatus capable of not only stably thinning and shaping dough, such as a pizza dough, and so forth, into a thin sheet-like shape, but also coping with dough in a wide variety of shapes with ease.

A dough processing apparatus according to the invention comprises a transfer means for transferring dough portioned out to have a predetermined quantity, a thinning means for thinning the dough being transferred by causing a plurality of beating members to alternately make a pressing motion, respectively, against the dough, and a shaping means for shaping the dough as rolled by surrounding the periphery of the dough with a horizontal die, and causing a plurality of rollers to be driven in rotation against the dough.

A dough-thinning apparatus according to the invention comprises a first beating means having a plurality of first beating members for pressing the dough being transferred along a line of action set to a direction deviated by a predetermined angle from a direction of transfer of the dough, a second beating means having a plurality of second beating members disposed between the respective first beating members so as to press the dough along the line of action, and a drive means for causing the first beating means and the second beating means to alternately execute a thinning operation.

An action region where thinning operations are executed by the first beating members and the second beating members, respectively, is preferably formed substantially in the shape of a rectangle, and a transfer path of the dough is preferably set so as to extend along the diagonal line of the rectangle.

Further, the respective first beating members as well as the respective second beating members have a first bearing face formed so as to cause the dough to be thinned in a direction substantially orthogonal to the line of action, and/or a second beating face formed so as to cause the dough to be thinned in a direction along the line of action.

A dough-shaping apparatus according to the invention comprises a horizontal die for surrounding the periphery of dough placed over a support body, a rotator provided with rollers rotatably fitted onto a plurality of axles radially extended around a support part, respectively, a positioning means for determining respective positions of the rotator, and the horizontal die so that the rollers are disposed in close proximity to an inner peripheral face of the horizontal die, and a drive means for driving the rotator in rotation so that the rollers rotatively reciprocate along the inner peripheral face of the horizontal die, wherein a bottom of the support part of the rotator is formed in a planar shape, and the rollers are set to be rotated on a plane along the bottom.

Further, the bottom is preferably provided with a flat plate formed so as to be freely rotatable around the rotation axis of the rotator.

Still further, the rollers each are preferably formed in the shape of a circular truncated cone with a diameter thereof, increasing along an outward direction extending from the support part, and the outermost ends of the rollers, respectively, are preferably butted against the inner peripheral face of the horizontal die.

Yet further, the rollers each are preferably provided with a curved face recessed toward the respective rotation center axes of the rollers, formed on the periphery of the outermost ends thereof.

Further, a plurality of grooves may be formed across the whole peripheral surface of at least part of the rollers.

Since the dough processing apparatus according to the invention is provided with the thinning means for thinning dough by causing the plurality of the beating members to alternately make the pressing motion, respectively, and the shaping means for shaping the dough as rolled by surrounding the periphery of the dough with the horizontal die, and causing the plurality of the rollers to be driven in rotation, a stable dough shaped in good order can be finished up. Further, the apparatus can be rendered compact in configuration.

With the dough-thinning apparatus according to the invention, the same portion of dough being transferred is beated a plurality of times by the respective first beating members, and the second beating members disposed, alternately, so that sufficient thinning is given to the dough to thereby deter shrinkage otherwise occurring to the dough when baked. Hence, while the dough is baked, a shape of the dough as thinned can be maintained without collapsing.

The dough-thinning apparatus being so simple in configuration, there is no need for installing two units of devices as required in the case of the conventional technologies shown in FIGS. 38, 39, and additional facilities, such as a conveyer for changing a transfer direction, and so forth, are unnecessary, so that a production line necessary for processing can be shorter, and the apparatus can be rendered more compact as compared with the conventional case.

Further, by setting the line of action to be an oblique direction deviated by a predetermined angle from the direction of transfer, respective thinning directions of the first beating member and the second beating member, against the dough, are deviated from the direction of transfer, to thereby enable more even thinning operations to be executed. For example, in the case of dough circular in shape, by deviating the line of action by about 45° from the direction of transfer, the respective thinning directions of the first beating member and the second beating member come to be similarly deviated by about 45° from the direction of transfer when beating is carried out in the direction orthogonal to the line of action, and in the direction along the line of action, respectively, so that substantially equal effects of transfer of the dough are exerted on both the thinning directions, thereby enabling an even thinning operation to be implemented. Further, if an angle to be deviated can be finely tuned while checking the shape of the dough after beating, it is also possible to finely adjust the shape of the dough.

Further, by forming the action region where thinning operations are executed by the first beating members and the second beating members, respectively, substantially in the shape of the rectangle, and setting the transfer path of the dough along the diagonal line of the rectangle, the thinning operation of the dough starts from a corner of the action region and as the dough is further transferred, a beating range thereof is gradually expanded, so that the dough can be smoothly thinned.

Because the respective first beating members as well as the respective second beating members have the first beating face formed so as to cause the dough to be thinned in the direction substantially orthogonal to the line of action, and/or the second beating face formed so as to cause the dough to be thinned in the direction along the line of action, the dough is rolled in two directions orthogonal to each other, so that respective portions of the dough are thinned so as to be evenly spread, thereby thinning the dough into a sheet-like shape in such a way as to evenly expand the dough in whole. Accordingly, if the dough before thinning is formed in a circular shape, the same can be thinned into dough in a sheet-like shape substantially even in thickness, and similarly circular at a time, which is suitable for thinning a pizza dough, and so forth.

With the dough-shaping apparatus according to the invention, the rollers are rotatably fitted onto the plurality of axles radially extended around the support part of the rotator, respectively, and positioning of the rotator is made such that the rollers are disposed in close proximity to the inner peripheral face of the horizontal die, thereby enabling the rollers to rotatively reciprocate along the inner peripheral face of the horizontal die, so that the periphery of the dough placed inside the horizontal die is shaped by the horizontal die, and the rollers that rotatively reciprocate to be thereby formed in a predetermined shape with an outline along the inner peripheral face of the horizontal die. Even if the dough is smaller in size than a region surrounded by the horizontal die, and is irregular in shape, the dough is spread by the rollers, reaching the inner peripheral face of the horizontal die to be restrained thereby, so that accurate shaping is implemented. Further, since the dough is spread with the rollers rotatively reciprocating, the dough can be spread with reliability as in the case of spreading the dough with conventional beating pins, and so forth, rotatively reciprocating, without reverting to a shape at the outset. Still further, since the bottom of the support part of the rotator is formed in the planar shape, and the rollers are set to be rotated on the plane along the bottom, it is possible to shape the dough such that the surface of the dough is formed in a smooth and planar shape parallel with the bottom. Furthermore, by adjusting a vertical position of the rotator, a thickness of dough to be shaped can be easily set.

Further, if the bottom is provided with the flat plate formed so as to be freely rotatable around the rotation axis of the rotator, the flat plate of the bottom is not rotated along with the rotator and remains in such a state as in close contact with the dough when the rotator is driven for rotation with the bottom being pressed to the dough, so that the dough is protected from damage such as twisting of the dough, due to rotation.

Still further, since the rollers each are formed in the shape of the circular truncated cone with the diameter thereof, increasing along the outward direction extending from the support part, and the outermost ends of the rollers, respectively, are preferably butted against the inner peripheral face of the horizontal die, the dough can be rolled without difficulty, and portions of the dough can be prevented from leaking between the horizontal die, and the rollers, thereby forming the peripheral edge of the dough in good order.

Yet further, if the rollers each are provided with the curved face recessed toward the respective rotation center axes of the rollers, formed on the periphery of the outermost ends thereof, it is possible to form the dough with a peripheral edge larger in thickness than the inner part thereof, so that, for example, a Neapolitan type pizza can be easily shaped.

Further, if the plurality of the grooves are formed across the whole peripheral surface of the at least part of the rollers, an operation to shape the dough by spreading the same can be efficiently executed by various combinations of both the rollers with grooves, and the rollers without grooves formed thereon.

PREFERRED EMBODIMENTS OF THE INVENTION

Embodiments of the invention are described in detail hereinafter with reference to the accompanying drawings. As the embodiments described are preferred specific examples in carrying out the invention, various technical limitations are made thereto, however, it is to be pointed out that the invention is not limited thereto unless otherwise explicitly described in the following description.

Figure 1:
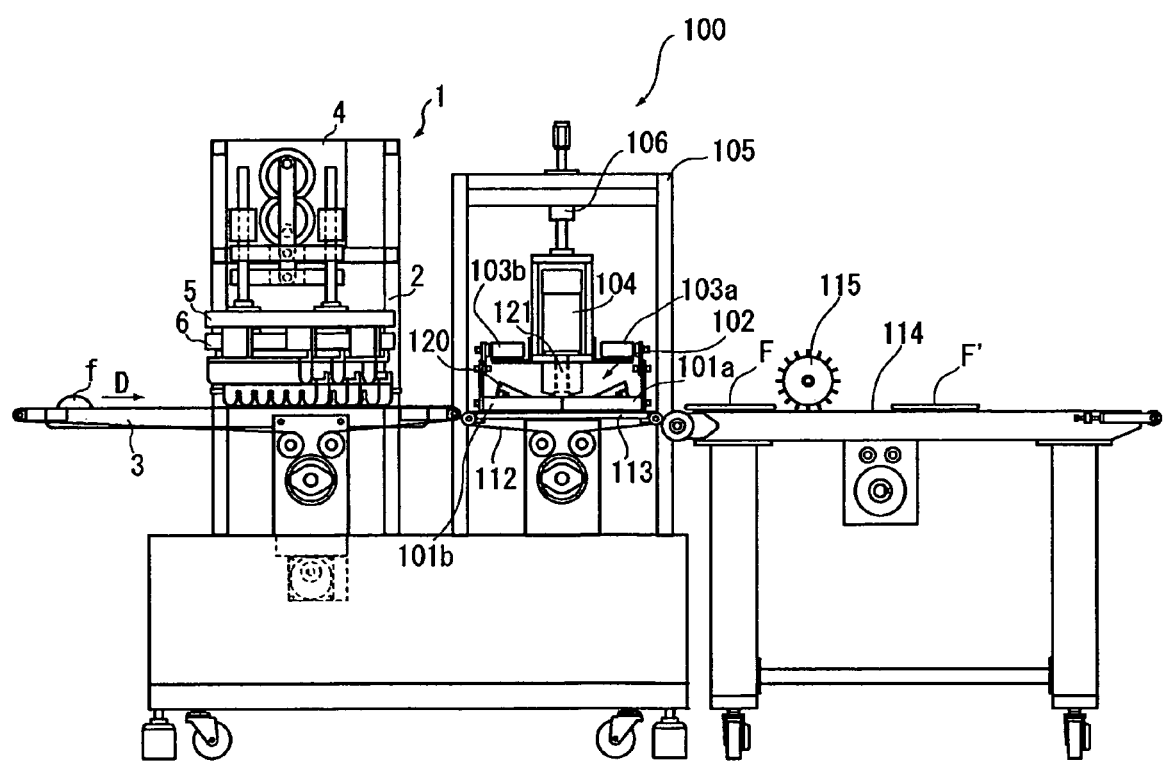
FIG. 1 is a general front elevation showing an embodiment of a dough processing apparatus according to the invention.

FIG. 1 is a general front elevation showing an embodiment of a dough processing apparatus according to the invention. The dough processing apparatus comprises a dough-thinning apparatus 1, and a dough-shaping apparatus 100. The dough-thinning apparatus 1 has a belt conveyor 3 for transferring dough f in the direction D of transfer, provided in the lower part of a platform frame 2. The upper part of the platform frame 2 is provided with a drive mechanism 4 for causing a first beating mechanism 5, and a second beating mechanism 6 to make a vertical movement, respectively.

In FIG. 1, indicated by reference numeral f is a rounded dough f obtained by portioning out dough to a predetermined quantity, and the dough f is transferred toward under the first beating mechanism 5, and the second beating mechanism 6 by the belt conveyor 3. The first beating mechanism 5, and the second beating mechanism 6 make the vertical movement, alternately, whereupon the dough f is pressed under pressure to be thereby thinned. The dough f after thinned is then transferred by the belt conveyor 3 to be delivered to the dough-shaping apparatus 100.

The dough f is transferred by a belt conveyor 112 supported by a fixed base 113 to be surrounded by a horizontal die 101 made up of die-pieces 101a, 101b on the belt conveyor 112. The die-pieces 101a, 101b are moved in the horizontal direction by air cylinders 103a, 103b, respectively, thereby acting in such a way as to approach, and part from each other. The dough f as surrounded by the horizontal die 101 is pushed down from above by a rotator 102 provided with a plurality of push-rollers 120. The rotator 102 is connected to a drive axle of a motor 104 via a rotating fixture axle 121, and upon rotation of the rotator 102, the dough f is rolled by the plurality of the push-rollers 120 to be thereby shaped into a shaped dough F in the shape of a thin sheet, circular in a plan view. The shaped dough F as formed after rolled is transferred toward a degassing roller 115 by a belt conveyor 114. A multitude of needles are erected on the peripheral surface of the degassing roller 115, and those needles pierce the top surface of the shaped dough F to thereby form a multitude of degassing pores, whereupon the shaped dough F is finished up as a degassed dough F'.

Figure 2:
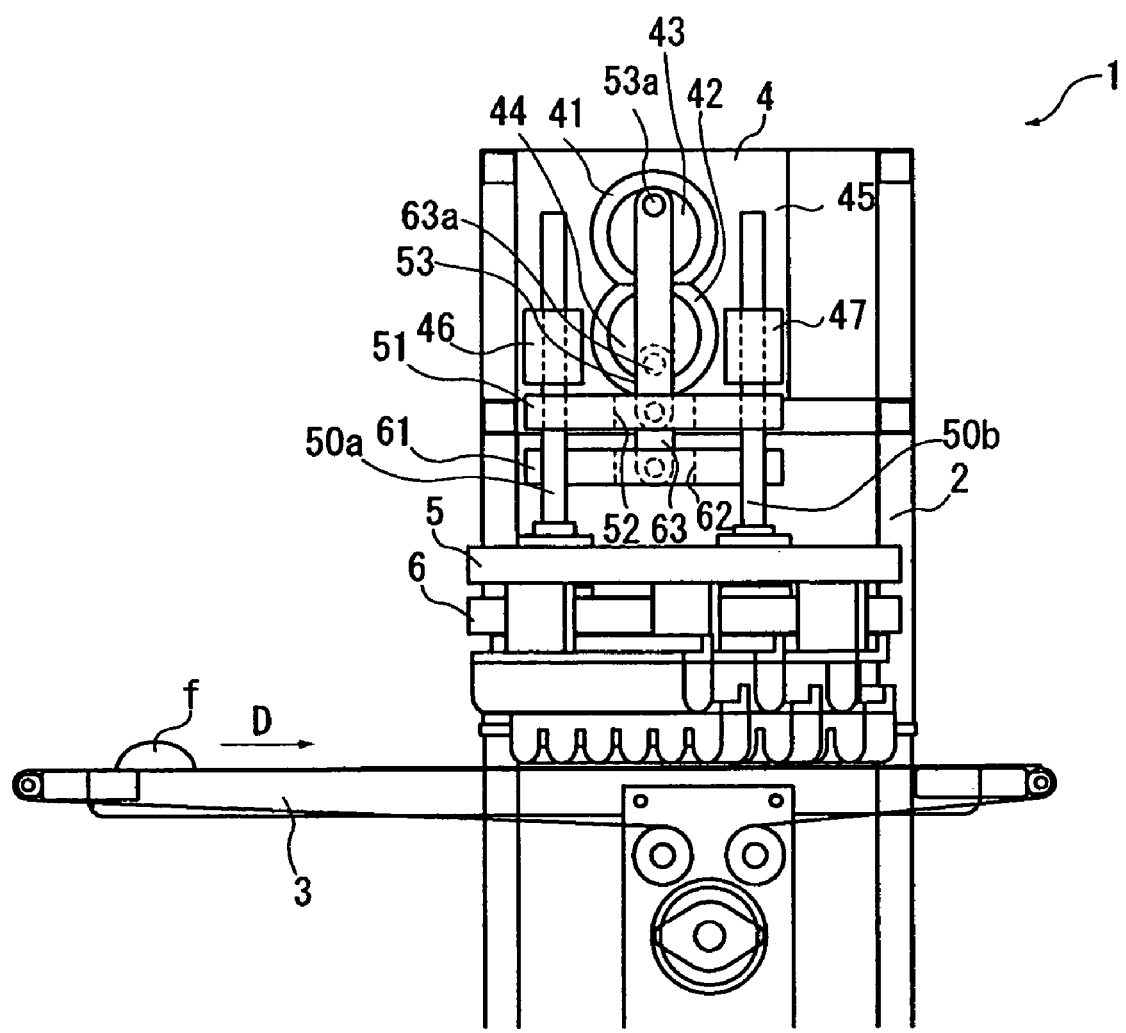
FIG. 2 is a front elevation of a dough-thinning apparatus according to the embodiment of the invention.
Figure 3:
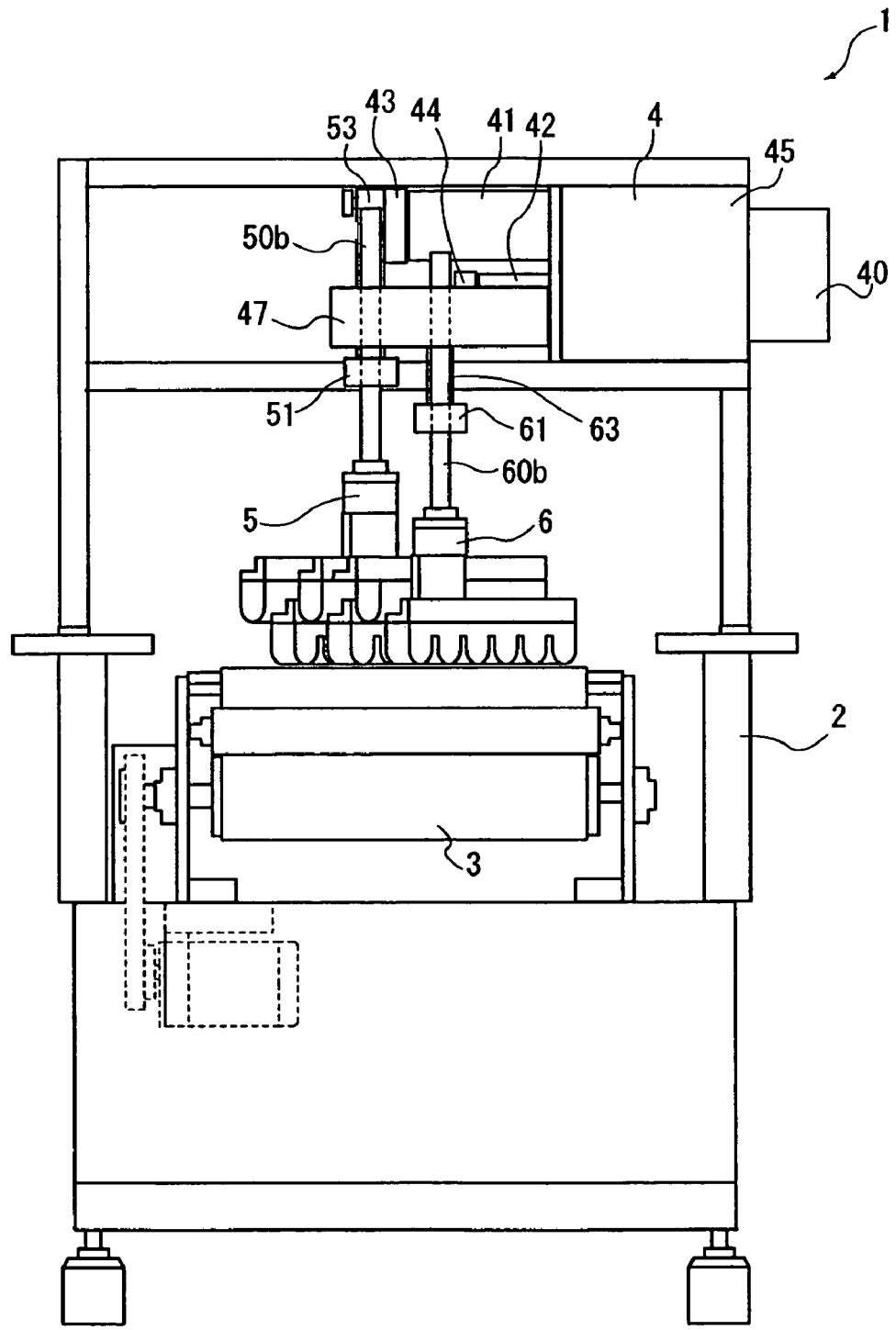
FIG. 3 is a side view of the dough-thinning apparatus.

Now, the dough-thinning apparatus 1 is described in detail hereinafter. FIG. 2 is a front elevation of the dough-thinning apparatus 1, and FIG. 3 is a side view of the dough-thinning apparatus 1.

The drive mechanism 4 is provided with a motor 40 as a drive source, and drive transmission mechanisms 41, 42, for transmitting rotational drive of the motor 40, and the drive transmission mechanisms 41, 42 are disposed inside the platform frame 2. The respective extremities of the drive transmission mechanisms 41, 42 are provided with rotating discs 43, 44, respectively, and the rotating discs 43, 44 are rotated in sync with each other according to the rotational drive of the motor 4.

The first beating mechanism 5 is provided with a pair of support shafts 50a, 50b, and the second beating mechanism 6 is also provided with a pair of support shafts 60a, 60b. Bearing housings 46, 47 are provided inside a cabinet 45 of the drive mechanism 4 so as to be protruded in the horizontal direction, and the support shafts 50a, 60a are inserted in holes bored in the bearing housings 46, respectively, in such a way as to be vertically movable while the support shafts 50b, 60b are inserted in holes bored in the bearing housings 47, respectively, in such a way as to be vertically movable.

A linkage bar 51 for linking and securing the pair of the support shafts 50a, 50b with each other is horizontally attached thereto, and a linkage bar 61 for linking and securing the pair of the support shafts 60a, 60b with each other is horizontally attached thereto. A fixture hole for securing each of the support shafts by inserting the same therein is bored at both end parts of the linkage bar 51 as well as the linkage bar 61, respectively, and the support shafts inserted in the respective fixture holes are fixedly attached thereto with a screw or the like, respectively.

An attachment hole 52 is bored at the center of the linkage bar 51, and a lower end of a crankshaft 53 is rotatably and pivotally held at the attachment hole 52. An upper end of the crankshaft 53 is rotatably and pivotally held at an off-center position of the rotating disc 43. A rotating motion of the rotating disc 43 causes the upper end of the crankshaft 53 to undergo a vertical motion, and the vertical motion of the crankshaft 53 comes to cause the pair of the support shafts 50a, 50b, together with the linkage bar 51, to make a vertical motion.

An attachment hole 62 is bored at the center of the linkage bar 61, and a lower end of a crankshaft 63 is rotatably and pivotally held at the attachment hole 62. An upper end of the crankshaft 63 is rotatably and pivotally held at an off-center position of the rotating disc 44. A rotating motion of the rotating disc 44 causes the upper end of the crankshaft 63 to undergo a vertical motion, and the vertical motion of the crankshaft 63 comes to cause the pair of the support shafts 60a, 60b, together with the linkage bar 61, to make a vertical motion.

An attachment position 53a of the crankshaft 53, on the rotating disc 43, is set to be shifted by 180° in rotation angle from an attachment position 63a of the crankshaft 63, on the rotating disc 44, and for example, if the attachment position 53a is positioned at the topmost part, as show in FIG. 2, the attachment position 63a will be positioned at the lowest part. Accordingly, when the support shafts 50a, 50b rise, the support shafts 60a, 60b fall, and when the support shafts 50a, 50b fall, the support shafts 60a, 60b rise, so that the two pairs of the support shafts each pair make either an upward-movement or downward-movement alternately.

Figure 4:
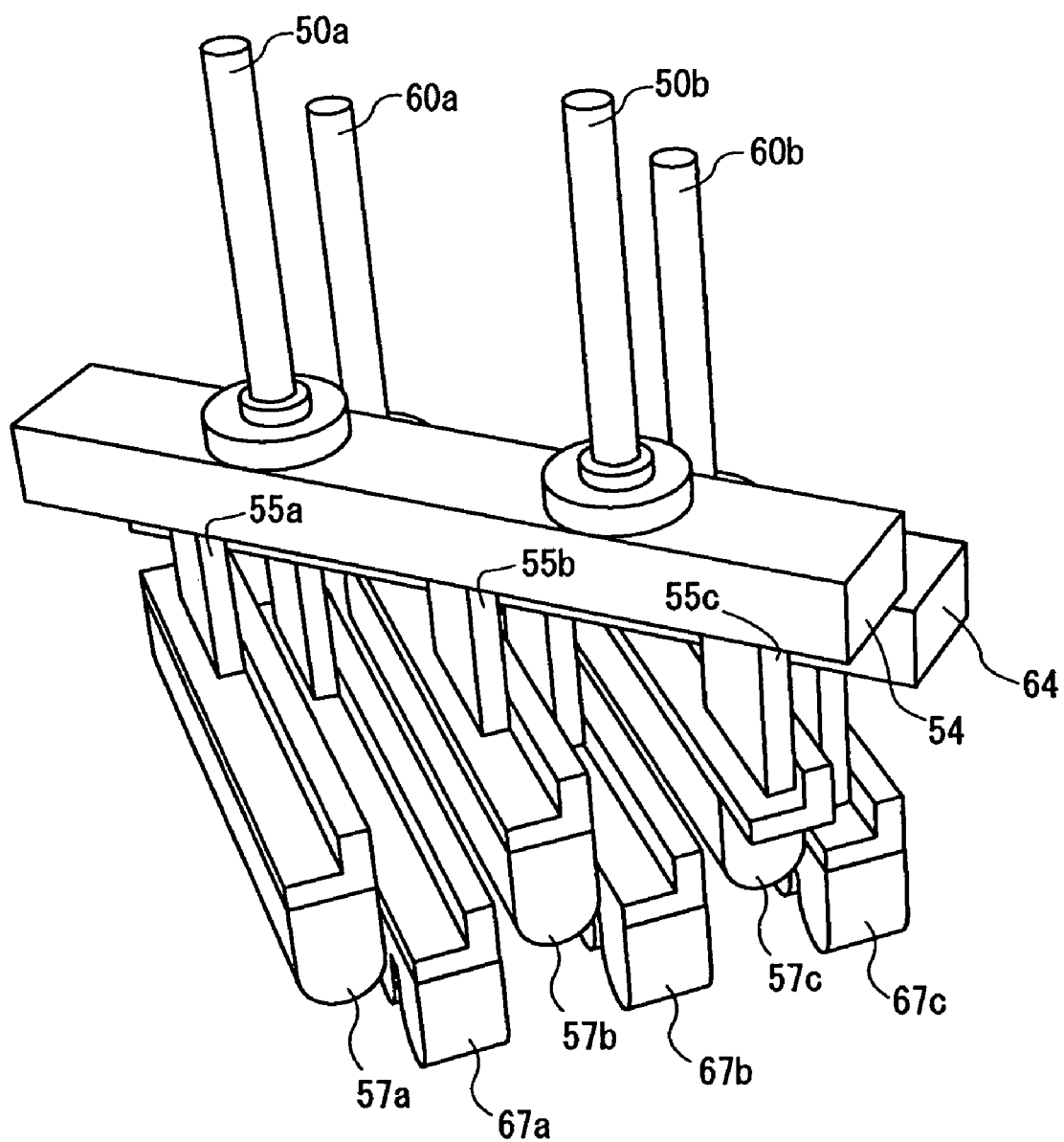
FIG. 4 is a perspective view showing a first beating mechanism, and a second beating mechanism.
Figure 5:
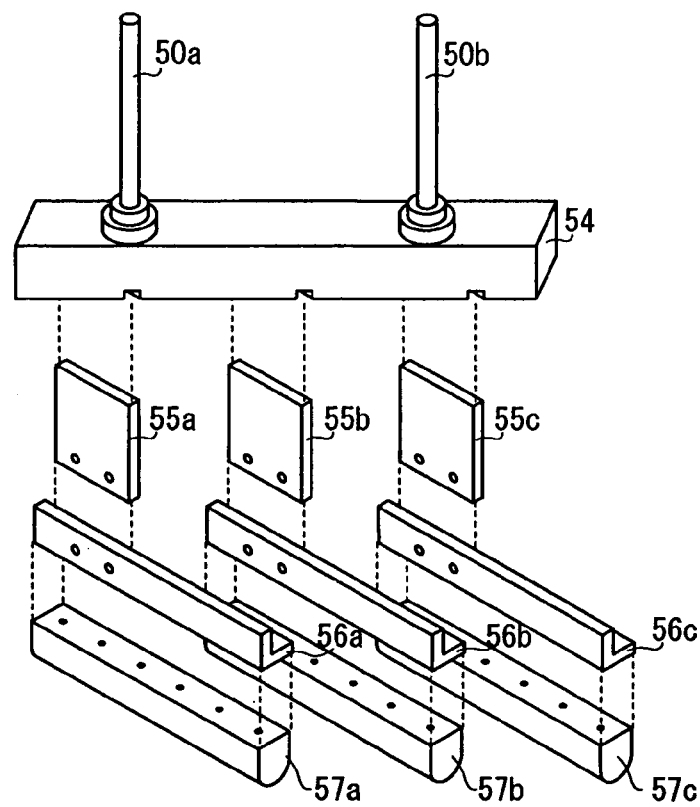
FIG. 5 is an exploded perspective view of the first beating mechanism.
Figure 6:
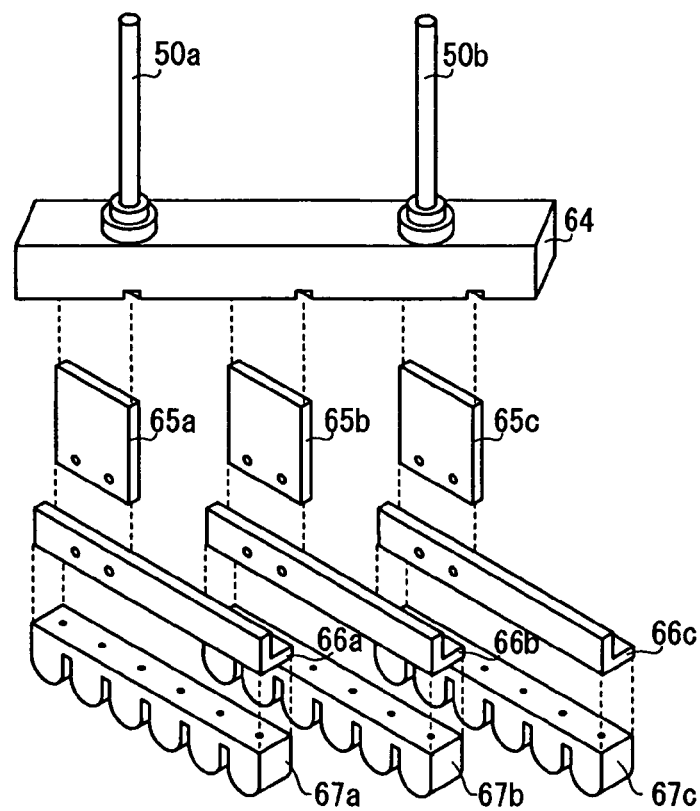
FIG. 6 is an exploded perspective view of the second beating mechanism.

FIG. 4 is a perspective view showing the first beating mechanism 5, and the second beating mechanism 6, FIG. 5 is an exploded perspective view of the first beating mechanism 5, and FIG. 6 is an exploded perspective view of the second beating mechanism 6.

A support member 54 bar-like in shape, disposed along the direction D of transfer of the dough f, is fixedly attached to respective lower ends of the pair of the support shafts 50a, 50b. Further, a support member 64 bar-like in shape, disposed along the direction D of transfer of the dough f, is fixedly attached to respective lower ends of the pair of the support shafts 60a, 60b.

As shown in FIG. 5, three support plates 55a to 55c, rectangular in shape, running in an oblique direction deviated by a predetermined degree from the direction D of transfer, are provided at equal intervals in such a way as to be vertically hung from the underside of the support member 54. Further, fixture members 56a to 56c each in a shape resembling the letter L in cross section are fixedly attached to the respective lower ends of the support plates 55a to 55c with a screw or the like, respectively.

The respective fixture members are fixedly attached to the respective support plates, whereupon the longitudinal directions of the respective fixture members come to coincide with the oblique direction in which the respective support plates are attached. The support plate 55a is fixed to an end position of the fixture member 56a, on the upstream side of the direction D of transfer, the support plate 55b is fixed to the center of the fixture member 56b, and the support plate 55c is fixed to an end position of the fixture member 56c, on the downstream side of the direction D of transfer, respectively, such that the fixture members 56a to 56c are lined up in an action region as described later on in description.

Figure 7A:
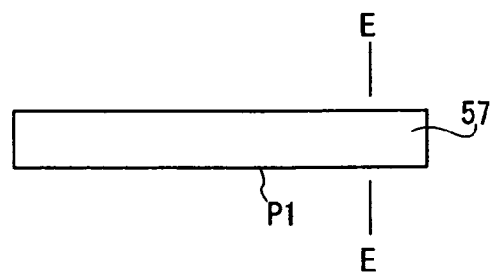
FIG. 7A is a side view of each of first beating members.
Figure 7B:
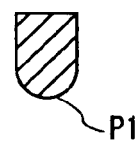
FIG. 7B is a cross-sectional view taken on line E-E of FIG. 7A.

First beating members 57a to 57c are fixedly attached to the respective undersides of the fixture members 56a to 56c with a screw or the like, respectively, such that the respective upper faces of the first beating members 57a to 57c are in close contact with the respective undersides of the fixture members 56a to 56c. The respective first beating members are formed in an identical shape, and the upper surfaces thereof each are formed in the shape of a flat plane while the undersides thereof each are formed in the shape of a curved surface. FIG. 7 shows a side view (FIG. 7A) of each of the first beating members, and a cross-sectional view (FIG. 7B) thereof, taken on line E-E of FIG. 7A, and each of the first beating members is formed in the shape of a bar, a first beating face P1 in the shape of a curved surface of a semicircular column in the axial direction along the longitudinal direction of the first beating member being formed across the underside thereof.

As shown in FIG. 6, the second beating mechanism 6 has a structure similar to that of the first beating mechanism 5, three support plates 65a to 65c are provided at equal intervals in such a way as to be vertically hung from the underside of the support member 64, and fixture members 66a to 66c each in a shape resembling the letter L are fixedly attached to the support plates 65a to 65c, respectively. Then, second beating members 67a to 67c are fixedly attached to the respective undersides of the fixture members 66a to 66c. Those members described as above are fixedly attached in the same way as in the case of the first beating mechanism 5.

Figure 8A:
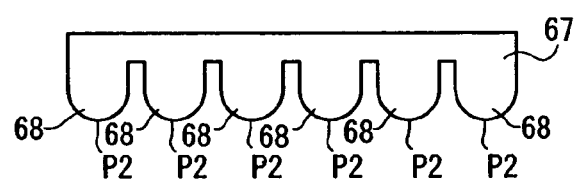
FIG. 8A is a side view of each of second beating members.
Figure 8B:
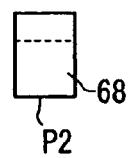
FIG. 8B is a front elevation thereof.

FIG. 8 shows a side view (FIG. 8A) of each of the second beating members, and a front elevation (FIG. 8B) thereof, and the second beating members 67a to 67c each are formed in the shape of a bar, the upper surface thereof being formed in the shape of a flat plane while a plurality of protrusions 68 being formed on the underside thereof. A second beating face P2 in the shape of a curved surface of a semicircular column in the axial direction along a direction substantially orthogonal to the longitudinal direction of the second beating member is formed on the undersides of the respective protrusions 68. The curved surface of each of the second beating faces P2 is set to have a curvature identical to that of the first beating face P1.

The first beating mechanism 5, and the second beating mechanism 6 are disposed so as to be combined with each other such that the second beating members 67a to 67c each are disposed between the respective first beating members 57a to 57c in a manner as shown in FIG. 4.

Figure 9A:
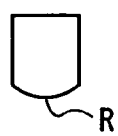
FIGS. 9A to 9C are cross-sectional views showing roll faces in various shapes, respectively.
Figure 9B:
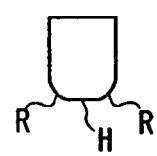
Figure 9C:
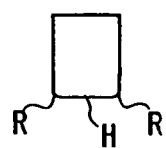

With the embodiment of the invention, described as above by way of an example, the first beating faces P1 of the respective first beating members 57, and the second beating faces P2 of the respective protrusions 68 of the second beating members 67 are formed in the shape of the curved surface of the semicircular column, respectively, however, as the invention is not particularly limited thereto, those bearing faces may have a smaller curvature, or each may be a face combining a flat face H with curved faces R as shown in FIGS. 9A to 9C. The shape of each of the beating faces may be altered as appropriate according to the characteristics of the dough, such as hardness, and so forth.

For example, because the dough that is soft and matured is spread well, the dough is preferably thinned with a beating face such as the curved surface of the semicircular column, having a large curvature. Further, if the dough is not matured as yet and is on the hard side, a beating face with a small curvature, as shown in FIG. 9A, and a beating face with a flat face H formed in the center region thereof, as shown in FIG.

9B, are preferably used. Furthermore, if the dough is low in moisture and is turned harder, or the dough is cooled to be thereby turned harder, a beating face set to have a flat face H large in width, as shown in FIG. 9C, is preferably used.

Figure 10:
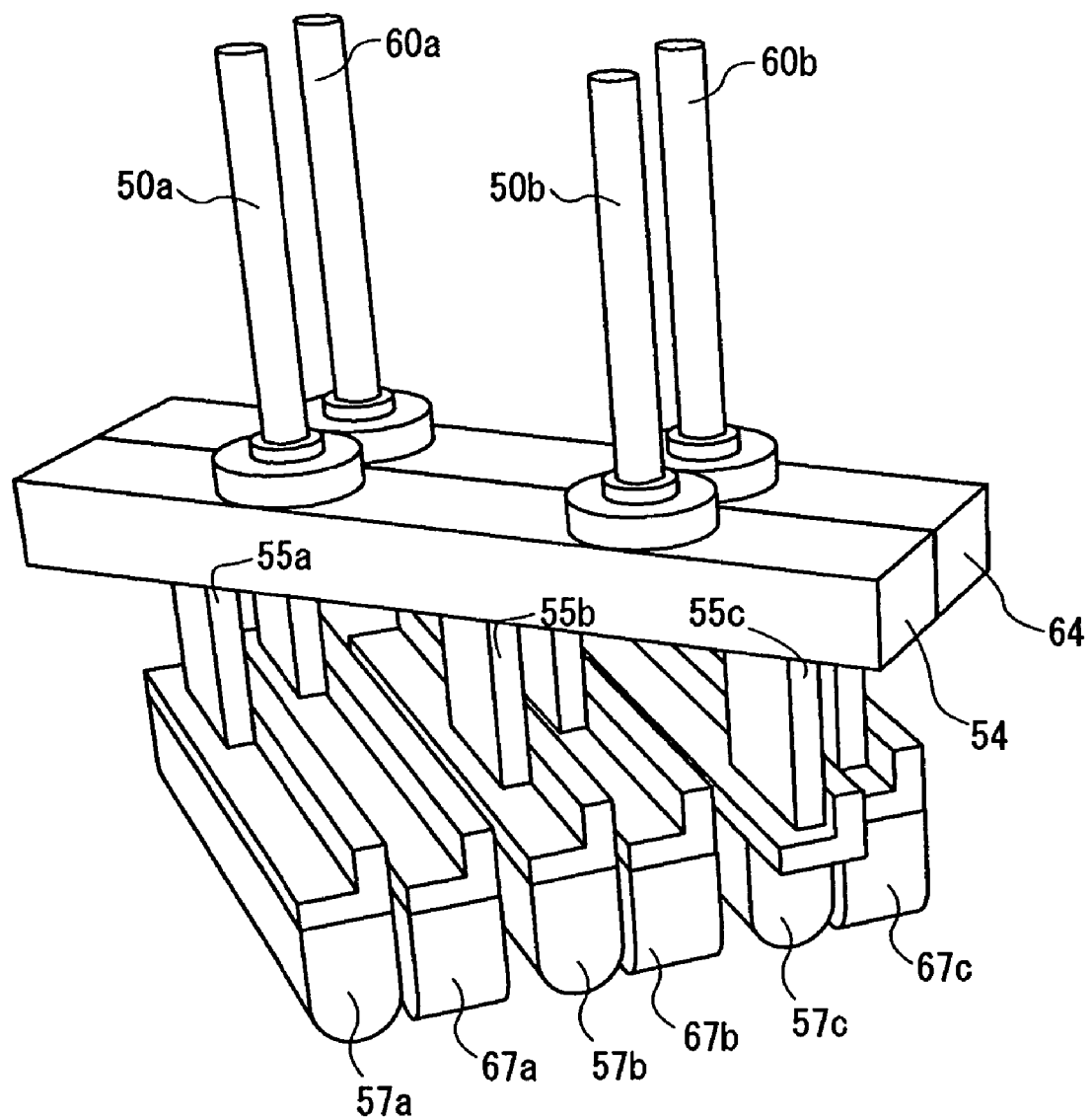
FIG. 10 is perspective view showing a state where the first beating members are aligned with the second beating members in parallel with each other.
Figure 11:
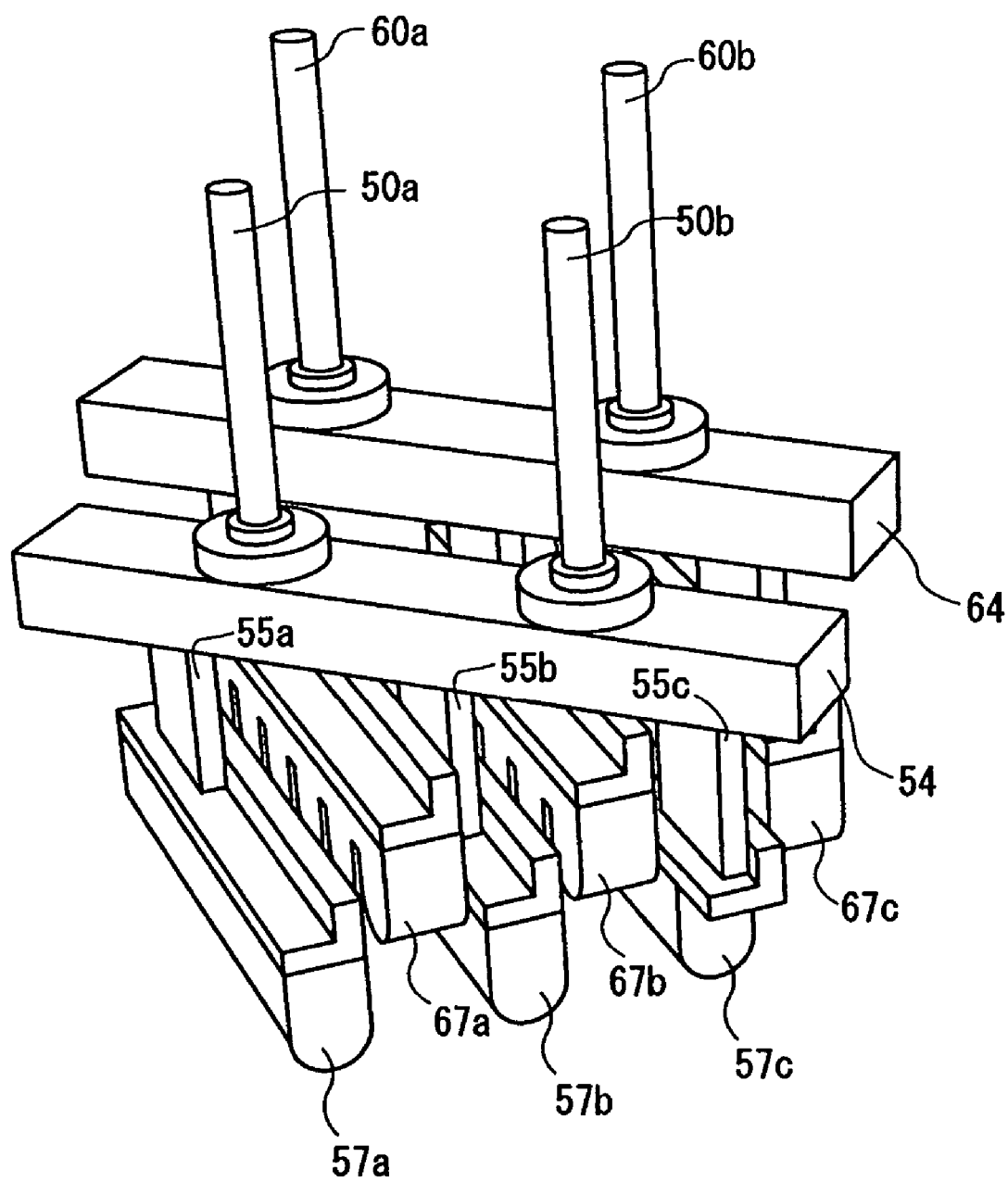
FIG. 11 is perspective view showing a state where the first beating mechanism falls, and the second beating mechanism rises.

Next, the respective operations of the first beating mechanism 5, and the second beating mechanism 6 are described hereinafter. Upon the start of the rotational drive of the motor 40, the rotating discs 43, 44 are rotated in sync with each other as described in the foregoing, whereupon the crankshafts 53, 63 undergo a vertical motion, respectively. Accordingly, a state where the first beating mechanism 5 rises, and the second beating mechanism 6 falls, as shown in FIG. 4, is turned into a state where the first beating mechanism 5 falls, and the second beating mechanism 6 rises, resulting in a state where the first beating members 57 are aligned with the second beating members 67 in parallel with each other (refer to FIG. 10), whereupon there is repeated the state where the first beating mechanism 5 falls, and the second beating mechanism 6 rises (refer to FIG. 11), thereby causing both the first and second beating mechanisms to act as if just stepping.

Respective heights of the first and second beating mechanisms are adjusted such that a gap between the first beating face of the first beating member as well as the second beating face of the second beating member and the belt conveyor 3 remain as predetermined when either the first beating mechanism or the second beating mechanism falls. The respective heights of the first and second beating mechanisms can be adjusted by installing, for example, a mechanism for vertically adjusting the position of the drive mechanism 4 in relation to the platform frame 2.

Thus, both the first and second beating mechanisms undergo a vertical movement, respectively, to thereby alternately execute a thinning operation against the dough f being transferred.

Figure 12:
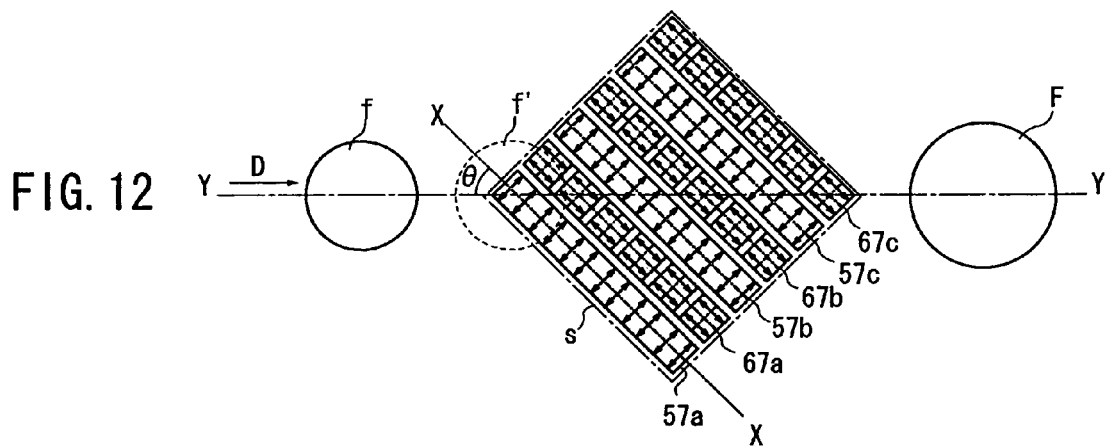
FIG. 12 is a schematic representation concerning thinning operations of both the first and second beating mechanisms.

FIG. 12 is a schematic representation concerning thinning operations of both the first and second beating mechanisms. In FIG. 12, there is shown a state of the first beating members 57a to 57c and the second beating members 67a to 67c as seen from above, and the arrows entered in the respective beating members indicate respective thinning directions of the first beating face P1, and second beating face P2. Assuming that an axial direction X-X, that is, the longitudinal direction of the bearing face of the first beating member, is a line of action against the dough, the line of action X-X is set to the oblique direction deviated by an angle θ from a center line Y-Y, in parallel with the direction D of transfer, and passing the center of the dough. The action region S where the first beating members as well as the second beating members executes thinning operations is formed in the shape of a rectangle, and the diagonal line of the rectangle is set to substantially coincide with the center line Y-Y Since the first beating face P1 is formed in the shape of the curved surface of the semicircular column in the axial direction along the line of action X-X, the dough is caused to be thinned in a direction substantially orthogonal to the line of action X-X. Further, the dough is thinned in such a way as to be pushed out toward the respective sides of the axial direction. On the other hand, the second beating face P2 of each of the protrusions 68 is formed in the shape of the curved surface of the semicircular column in the axial direction along the direction substantially orthogonal to the line of action X-X, so that the dough is caused to be thinned in a direction along the line of action X-X. Consequently, as shown by the arrows, the dough is rolled in such a way as to be pushed out toward the respective sides of the axial direction of each of the second beating faces P2.

Upon the dough f as transferred entering a part of the action region S, at a position indicated by a dotted line, the first beating member 57a positioned at the leading head of the diagonal line of the action region S first presses the dough f to thereby thin the same in the direction of the arrows with the first beating face P1. Subsequently, the second beating member 67a presses a portion of the dough f, thinned by the first beating member 57a, to thereby thin the same in the direction of the arrows with the second beating face P2. While the dough f is thus transferred, the first beating face P1 and the second beating face P2 are caused to alternately apply a thinning operation to respective portions of the dough f, so that the dough f is repeatedly thinned in two directions orthogonal to each other to thereby undergo substantially even thinning in the respective directions. With this example, as the first beating face P1 and the second beating face P2 are in the shape of the same curved surface, the same thinning operation is applied to the dough, so that more even thinning can be implemented.

Further, by setting the line of action to be the oblique direction deviated by a predetermined angle from the direction of transfer, it is possible to deter an adverse effect of the dough f being transferred when the first beating member and the second beating member press the dough f, respectively. If the angle θ is set to, for example, 45°, respective thinning directions of the first beating face P1 and the second beating face P2 come to be deviated by 45° from the direction D of transfer of the dough f, and the effect of transfer is similarly exerted on the dough f, so that thinning is executed evenly in the respective directions.

As described above, by setting the line of action to be the oblique direction deviated by a predetermined angle from the direction of transfer, the dough f is thinned starting from a corner thereof, corresponding to the leading head of the diagonal line, and as the dough f is further transferred, a thinned portion thereof comes to be sequentially increased in width, so that the dough f circular in shape is substantially evenly thinned without disfiguring the shape thereof, thereby enabling the dough f to be thinned into the shape of a circular thin sheet, like the shaped dough F.

Figure 13:
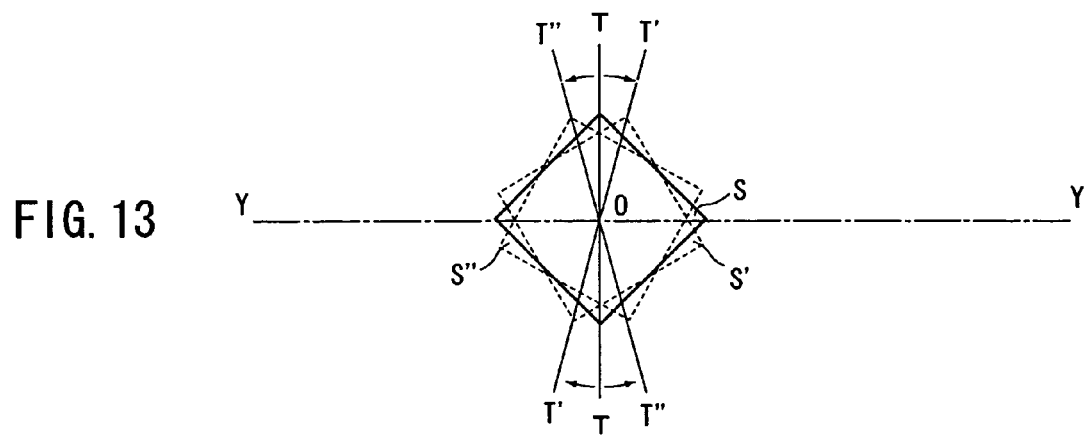
FIG. 13 is a schematic representation showing an adjustment method for use in the case of adjusting respective positions of the first beating members as well as the second beating members.

FIG. 13 is a schematic representation showing an adjustment method for use in the case of adjusting respective positions of the first beating members as well as the second beating members. By shifting the action region S defined by both the first beating member and the second beating member in such a way as to rotate a center line T-T of the action region S clockwise, or counterclockwise, it is possible to set such that the respective thinning directions of both the beating members can rotatively reciprocate for adjustment to thereby enable an optimum thinning operation to be executed. The shifting of the action region S can be implemented by causing the first beating mechanism 5, and the second beating mechanism 6, together with the drive mechanism 4, to rotatively reciprocate. Even in the case where the respective thinning directions of the first beating face P1 and the second beating face P2 are not uniform due to a mechanical error, in particular, it is possible to set an optimum thinning direction by adjusting the respective positions of the first beating member and the second beating member to thereby adjust the angle θ of the line of action X-X.

With the use of the dough-thinning apparatus described in the foregoing, a formed-dough divided into the shape of a knoll-like bun, about 130 mm in diameter, and about 50 mm in height, is thinned, whereupon it was possible to thin the same into dough in the shape of a thin sheet, circular in a plan view, about 230 mm in diameter, and about 3 mm in height.

With the example described as above, combination of the first beating faces P1 with the second beating faces P2, in the action region S, is effected by forming the first beating face P1 across the underside of each of the first beating members, and the second beating face P2 on the undersides of the respective protrusions, however, the combination of the first beating faces P1 with the second beating faces P2 can be variously changed, and can be variously selected according to the characteristics of dough to be thinned.

Figure 14A:
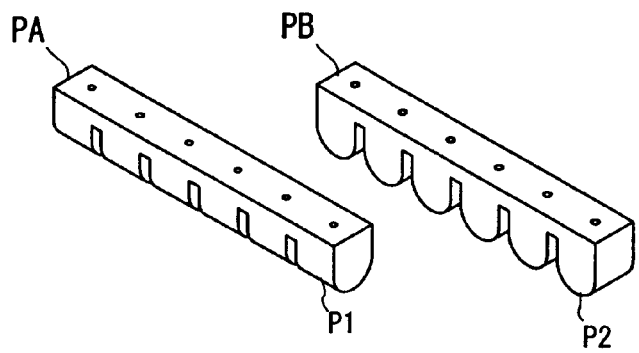
FIGS. 14A to 14C are schematic representations concerning other beating members and array thereof.
Figure 14B:
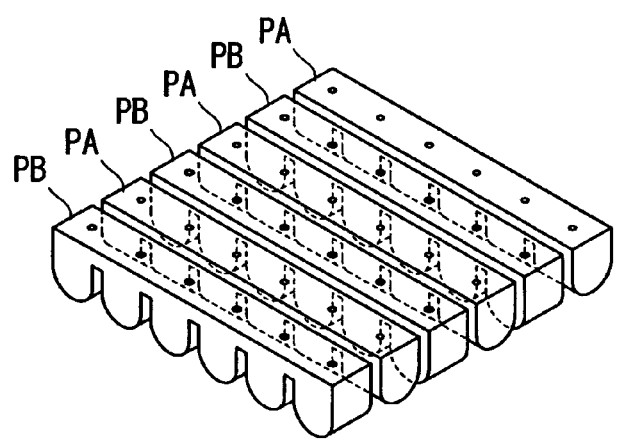

In FIG. 14, for example, two kinds of beating members PA, PB are used as the beating members (refer to FIG. 14A). With the beating member PA, the first beating face P1 is formed for every protrusion, and with the beating member PB, the second beating face P2 is formed for every protrusion. Respective lengths of the protrusions of both the beating member PA, and the beating member PB, in the longitudinal direction thereof, are set so as to be identical to each other.

Figure 14C:
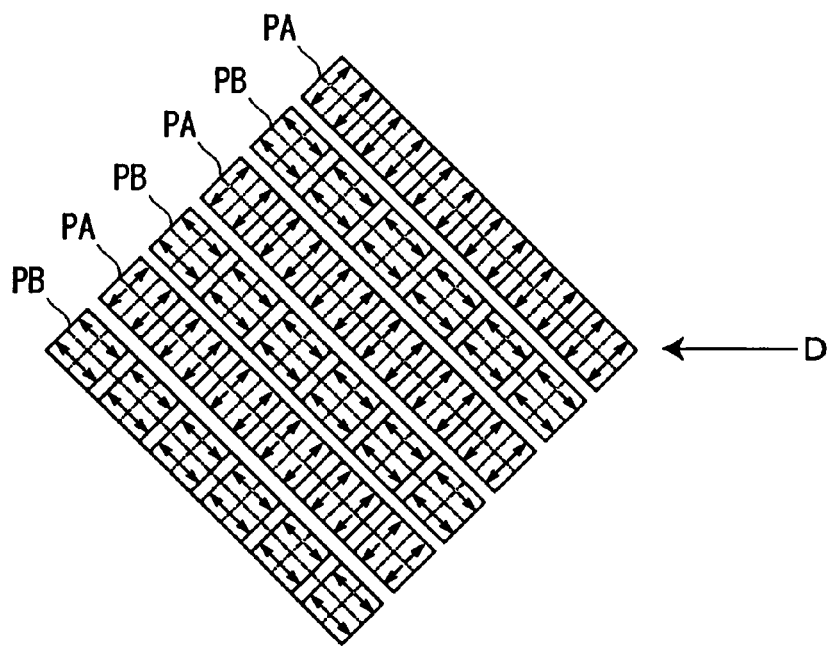

Then, the beating members PA, and the beating members PB are alternately arrayed (refer to FIG. 14B), and the line of action is set to be an oblique direction deviated by a predetermined angle from the direction D of transfer as shown in FIG. 14C. By alternately arranging the first beating face P1, and the second beating face P2, formed in the same shape, it is possible to execute an even thinning operation.

Figure 15A:
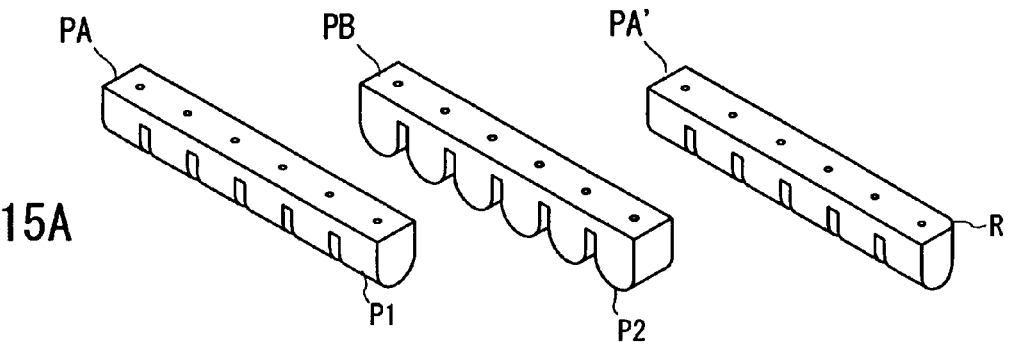
FIGS. 15A to 15C are schematic representations concerning still other beating members and array thereof.
Figure 15B:
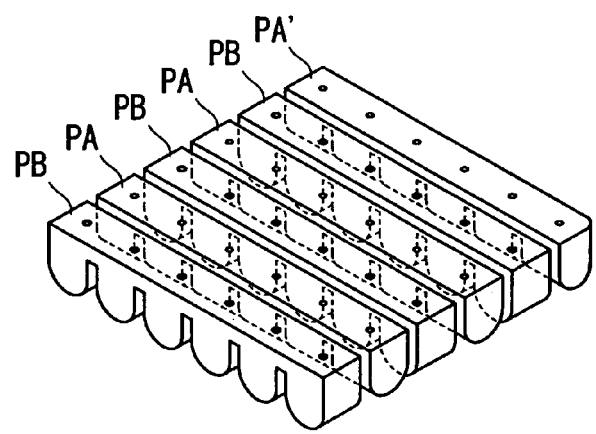
Figure 15C:
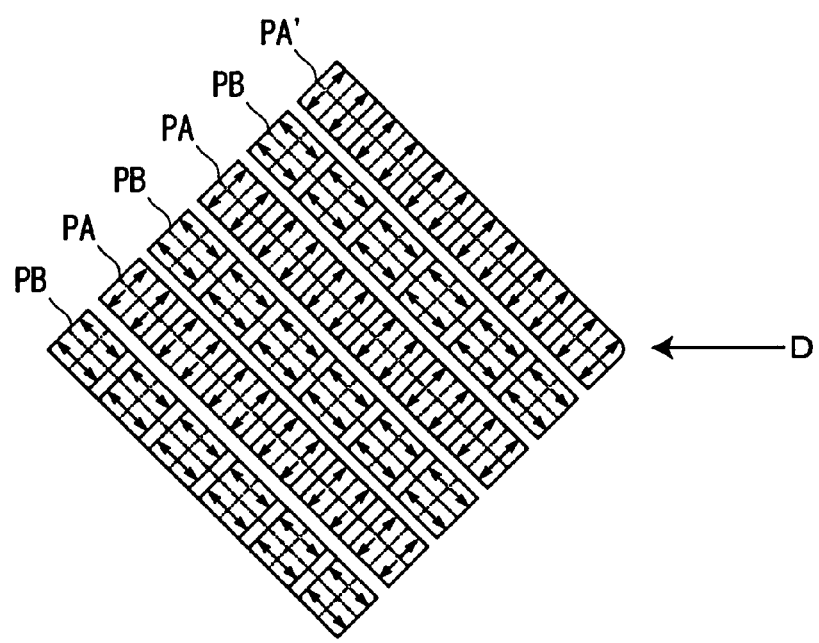

FIG. 15 shows a variation of an example shown in FIG. 14, wherein there is added a beating member PA' formed by rounding a corner R of one of the beating members PA (refer to FIG. 15A). The beating member PA' is arrayed so as to be positioned on the most upstream side in the direction D of transfer (refer to FIG. 15B) such that the corner R is disposed at a portion of the beating member PA', pressing the dough at first, as shown in FIG. 15C. Because the corner R as rounded presses the dough at first, it is possible to execute a thinning operation in such a way as not to mar the dough so much as the case of the corner R being square.

Figure 16A:
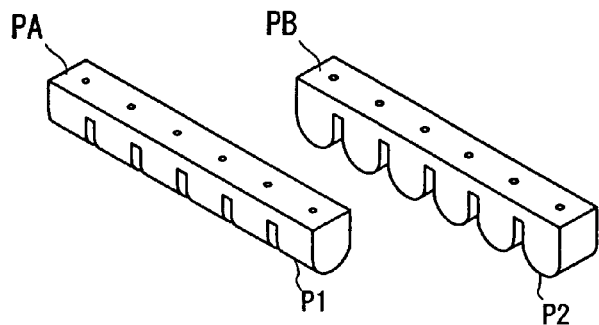
FIGS. 16A to 16C are schematic representations concerning yet other beating members and array thereof.
Figure 16B:
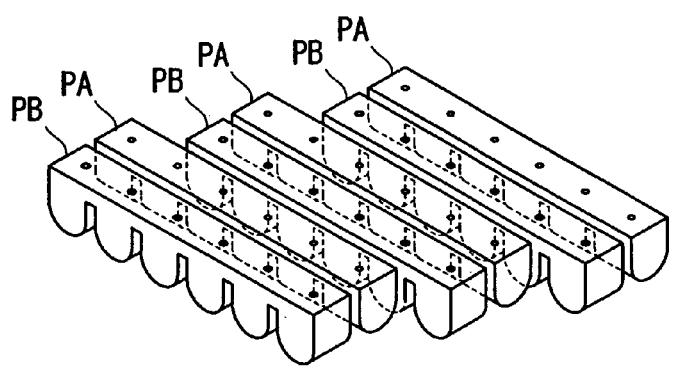
Figure 16C:
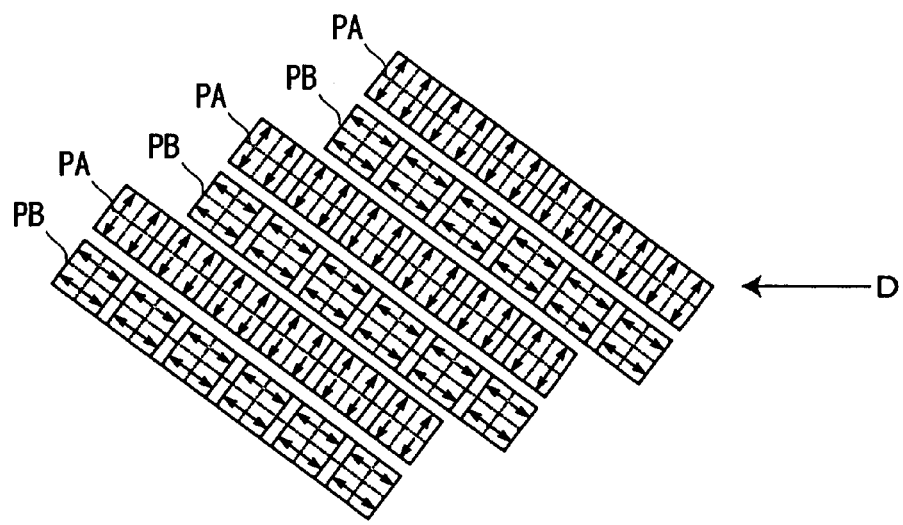
Figure 17:
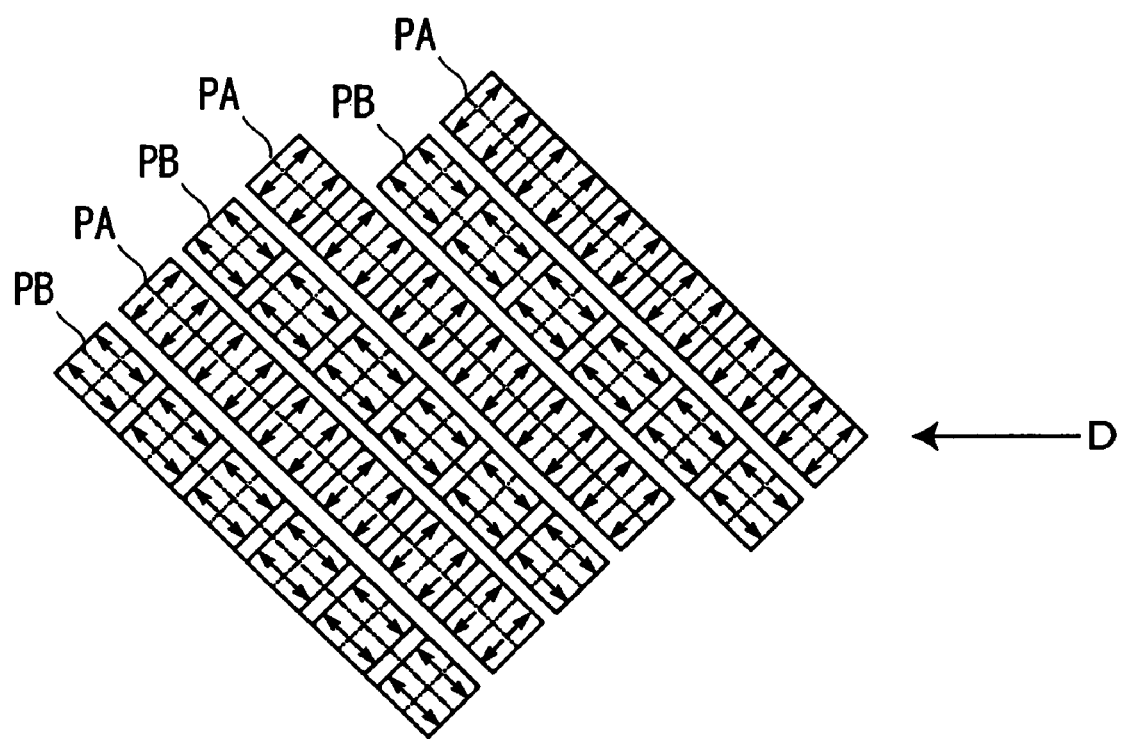
FIG. 17 a schematic representation showing a variation of the array shown in FIG. 15.

FIG. 16 shows another variation of the example shown in FIG. 14, wherein the beating member PA, and the beating member PB are used similarly to the case of the example shown in FIG. 14 (refer to FIG. 16A), and while the beating members PA, and the beating members PB are alternately arrayed, every pair thereof is disposed so as to be staggered in the longitudinal direction thereof (refer to FIG. 16B). In addition, inclination of the line of action of the beating member PA as well as the beating member PB, against the direction D of transfer, is rendered smaller (refer to FIG. 16C). Accordingly, such a configuration is useful for the case of beating the dough so as to be extended longer along the direction of transfer, and so forth. As another method for disposing the beating members so as to be staggered as described above, only two of the beating members, on the upstream side in the direction D of transfer, may be disposed so as to be staggered as shown in FIG. 17, which may be set as appropriate so as to match the shape of dough to be thinned.

Figure 18A:
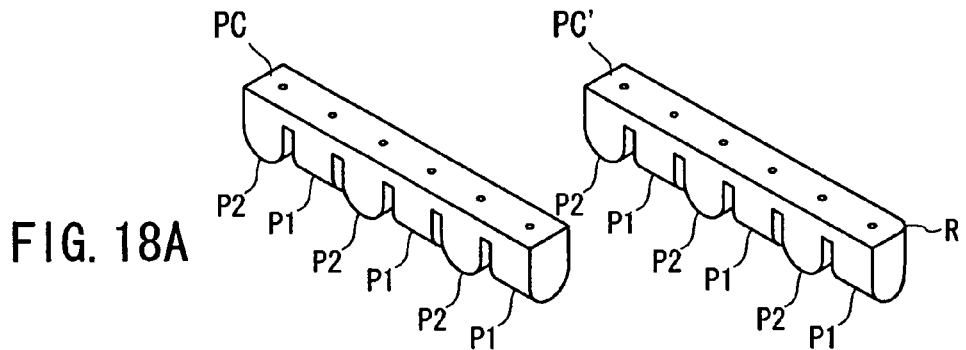
FIGS. 18A to 18C are schematic representations concerning further beating members and array thereof.
Figure 18B:
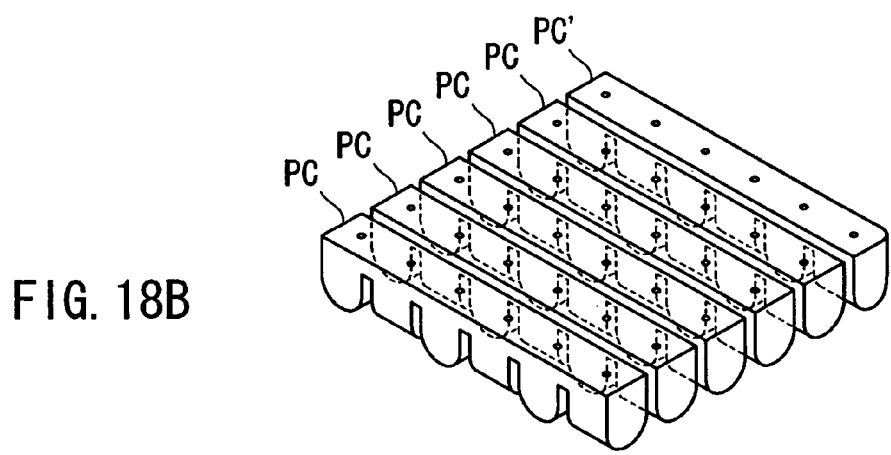
Figure 18C:
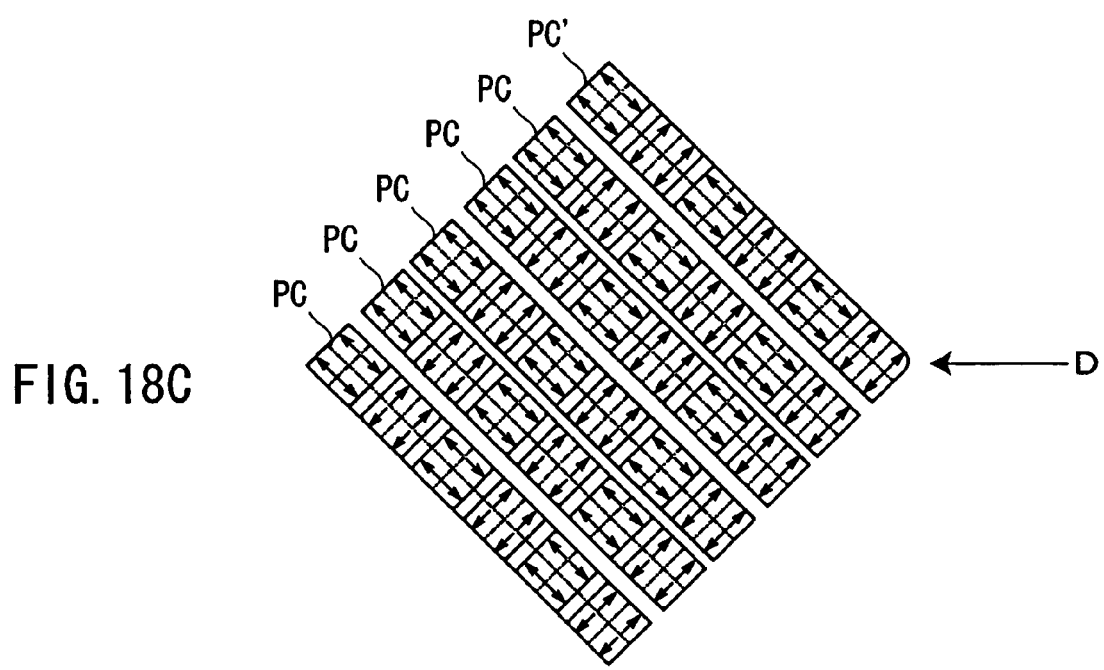
Figure 19A:
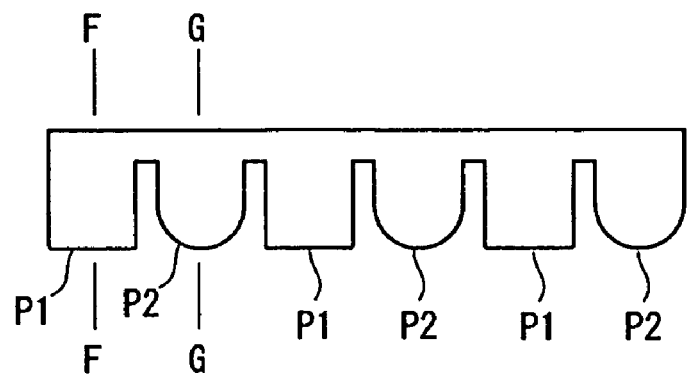
FIG. 19A is a side view of another beating member, FIG. 19B a cross-sectional view taken on line F-F of FIG. 19A, and FIG. 19C a cross-sectional view taken on line G-G of FIG. 19A.
Figure 19B:
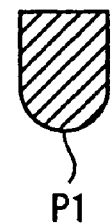
Figure 19C:

FIGS. 18A to 18C show an example using beating members PC in another shape. As with the beating members PA, PB, a plurality of protrusions are formed on the underside of each of the beating members PC, however, the first beating face P1, and the second beating face P2 are alternately formed on the respective protrusions. FIG. 19 shows a side view of the beating member PC (FIG. 19A), a cross-sectional view taken on line F-F of FIG. 19A (FIG. 19B), and a cross-sectional view taken on line G-G of FIG. 19A (FIG. 19C). The first beating face P1, and the second beating face P2 are similarly formed in the shape of a curved surface of a semicircular column, and the axial direction of the first beating face P1 is set to coincide with the longitudinal direction of the beating member PC while the axial direction of the second beating face P2 is set to coincide with a direction orthogonal to the longitudinal direction of the beating member PC.

Then, if the beating members PC are arrayed such that an action region rectangular in shape is formed by each of the beating members PC as shown in FIG. 18B, the first beating face P1, and the second beating face P2 are alternately arrayed throughout the action regions as shown in FIG. 18C. Accordingly, the first beating face P1, and the second beating face P2 are aligned in a row, respectively, in contrast with the cases shown in FIGS. 14, 15, respectively, and a direction of alignment thereof is orthogonal to the line of action. Further, with this example, there is added a beating member PC' formed by rounding a corner R of one of the beating members PC.

Figure 20A:
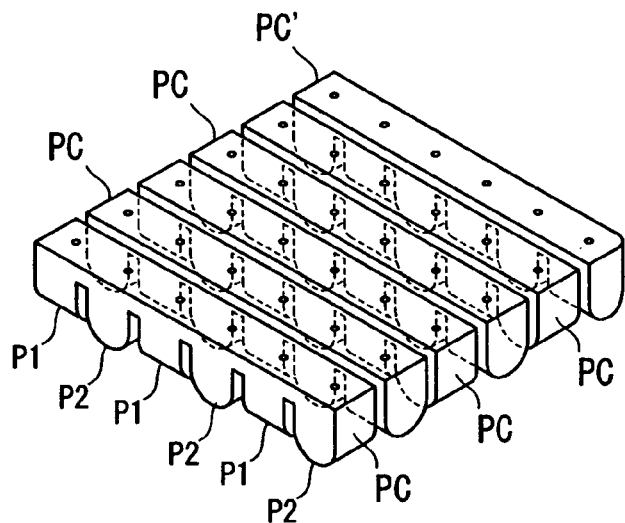
FIGS. 20A and 20B are schematic representations concerning another array of the beating members.
Figure 20B:
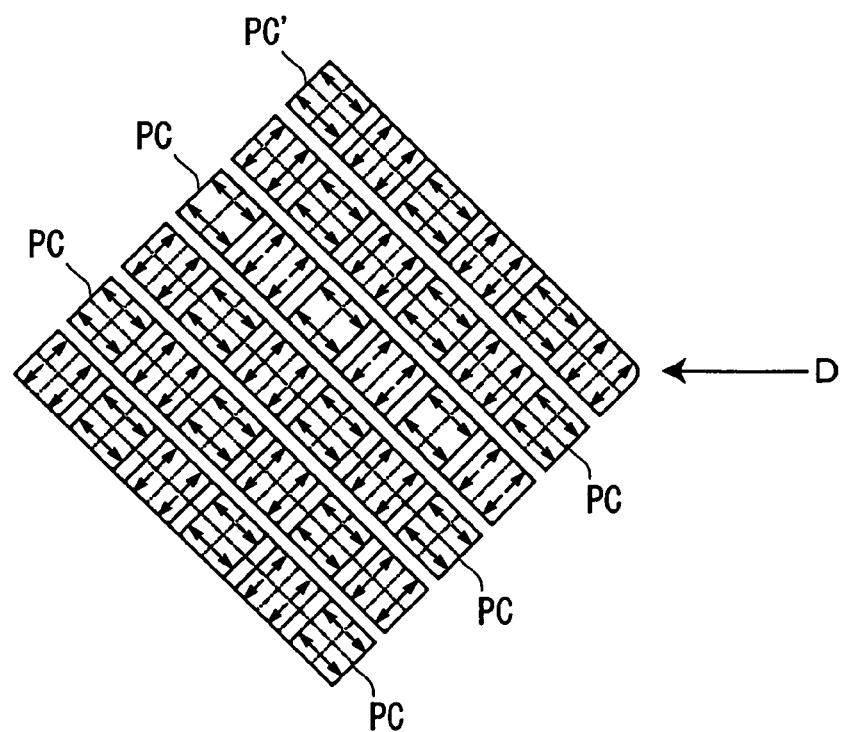
Figure 21A:
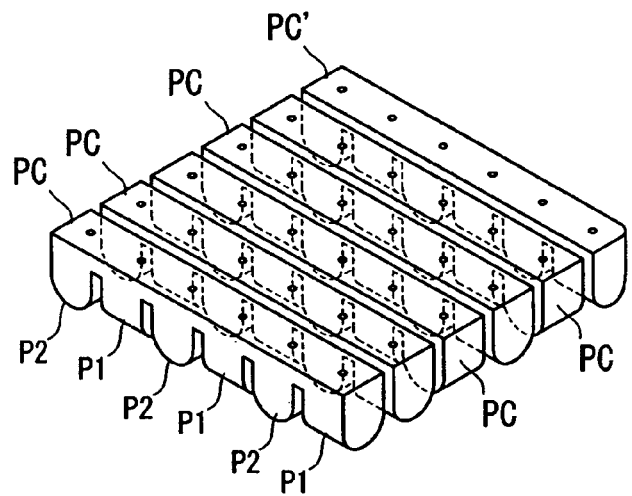
FIGS. 21A and 21B are schematic representations concerning still another array of the beating members.
Figure 21B:
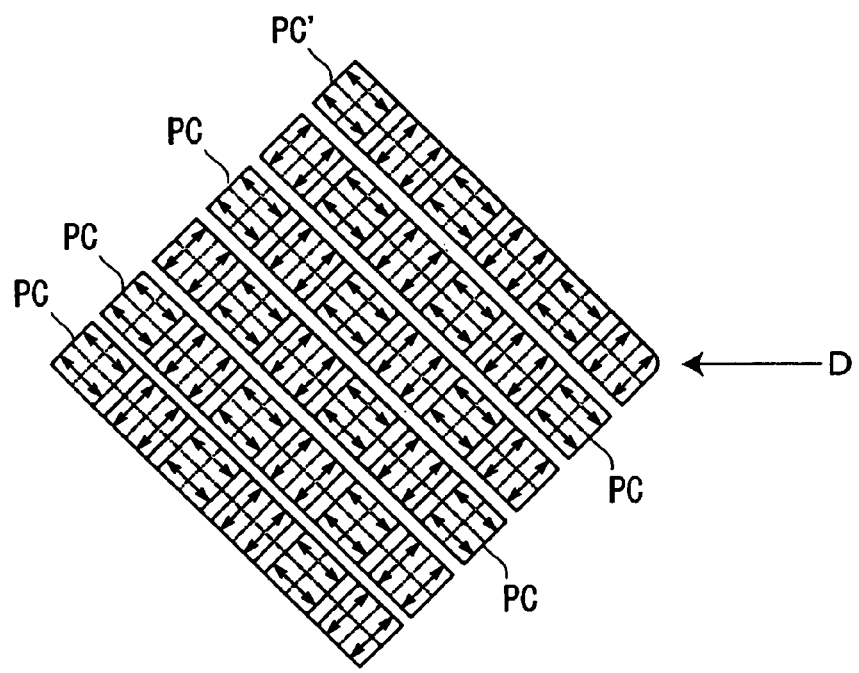

FIGS. 20, 21 each show another example using the beating members PC. With the example shown in FIG. 20, the beating members PC are arrayed such that the longitudinal direction of every other one thereof is reversed as shown in FIG. 20A. Accordingly, as shown in FIG. 20B, the first beating face P1, and the second beating face P2 are set so as to be alternately arrayed in a direction orthogonal to the longitudinal direction of each of the beating members PC, as well. Furthermore, as with the examples shown in FIGS. 21A, 21B, the beating members PC may be arrayed such that only part of the beating members PC is arrayed in the same longitudinal direction, and as to a method for arraying the beating members PC, various arrays other than the above-described are conceivable.

By combining those beating members together as appropriate, it is possible to finely set respective arrays and sizes of the first beating face P1, and the second beating face P2 so as to match the characteristics of dough to be thinned. The following can be considered as the embodiments of invention concerning the first beating face P1, and the second beating face P2, formed on the first and second beating members, respectively.

(1) First and second beating members each comprise a first beating face formed so as to thin the dough in a direction substantially orthogonal to the line of action, and/or a second beating face formed so as to thin the dough in a direction along the line of action, respectively.

(2) At least either of the first and second beating members each have the first beating face formed across a pressing face.

(3) At least either of the first and second beating members each have the first beating face formed on the surface of at least one of a plurality of protrusions arrayed along the line of action.

(4) At least either of the first and second beating members each have the second beating face formed on the surface of at least one of a plurality of protrusions arrayed along the line of action.

(5) The first beating face is in the shape of a curved surface of a circular column formed along the line of action, and the second beating face is in the shape of a curved surface of a circular column formed along a direction substantially orthogonal to the line of action.

By forming the first beating face across each of the pressing faces of at least either of the first and second beating members, or by forming the first beating face or the second beating face on the surface of at least one of the plurality of the protrusions arrayed along the line of action, it is possible to set such that the first beating face is combined with the second beating face as appropriate according to the characteristics of dough, such as hardness, and so forth, to make up the pressing faces of the first and second beating members, respectively, thereby exhibiting an optimum beating effect.

Further, by forming the first beating face in the shape of the curved surface of the circular column along the line of action, and the second beating face in the shape of the curved surface of the circular column along the direction substantially orthogonal to the line of action, an even pressing force can be applied to the dough in thinning operation of the respective pressing faces.

Still further, the first beating face P1 as well as the second beating face P2, in the shape of the curved surface of the circular column, has been described by way of example, however, shapes other than the curved surface of the circular column, such as a curved surface of a semicircular column, and so forth, may be used. Yet further, respective shapes and sizes of the protrusions formed on the respective beating members, and intervals between the protrusions may be set as appropriate according to the shapes of the pressing faces and thinning characteristics of the dough, if needs be.

Figure 22A:
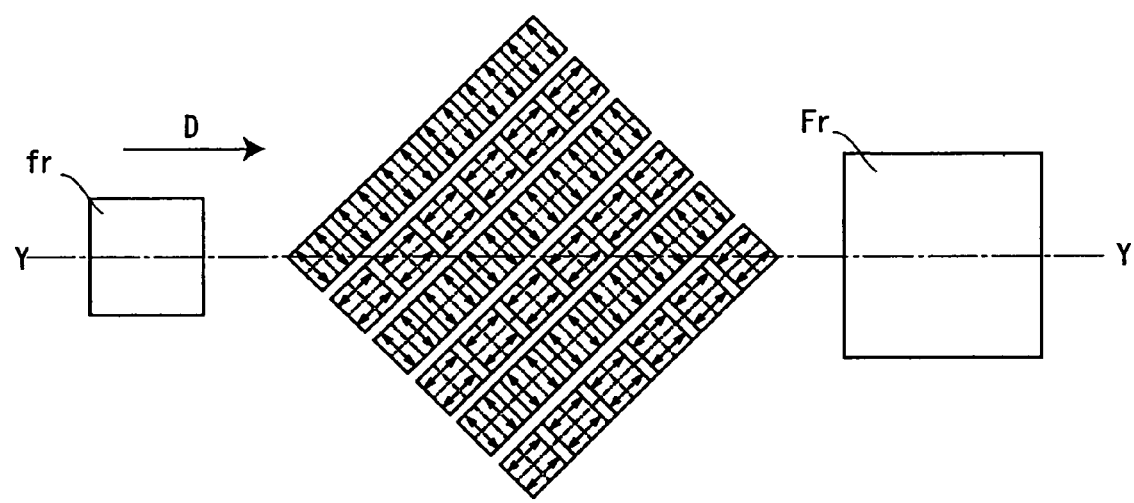
FIGS. 22A and 22B are schematic representations concerning thinning operations against dough in different shapes, respectively.
Figure 22B:
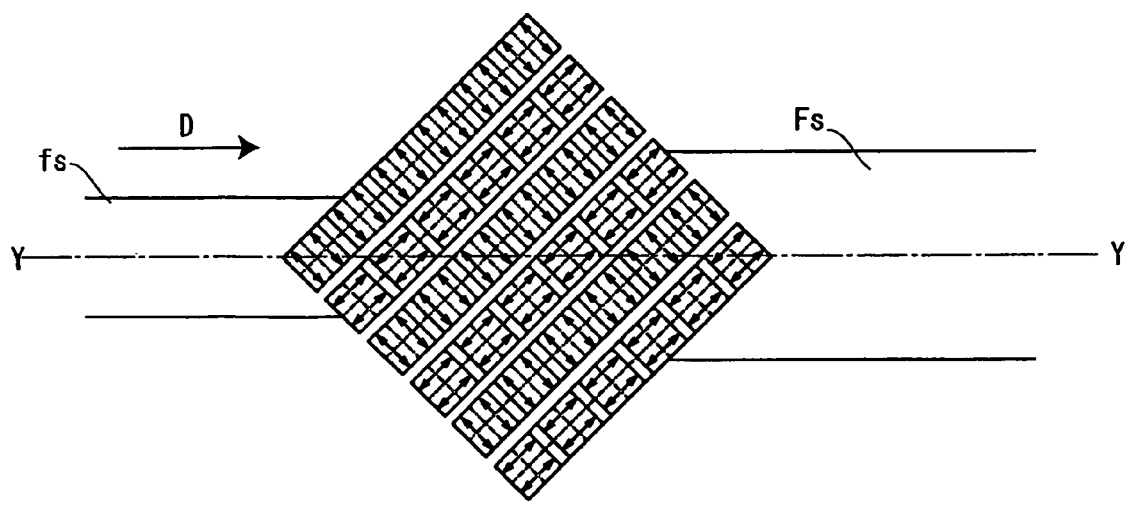

Further, with those examples described in the foregoing, the dough circular in shape has been described by way of example, however, with the use of the dough-thinning apparatus according to the invention, it is possible to similarly roll dough fr square in shape to a small thickness as shown in FIG. 22A, and the dough fr large and square in shape can be formed without disfiguring the shape thereof. Further, as shown in FIG. 22B, it is also possible to thin dough fs continuously discharged in the shape of a sheet with a predetermined width to a small thickness to thereby form dough Fs in the shape of a sheet with a larger width.

Now, the dough-shaping apparatus 100 is described in detail hereinafter. As shown in FIG. 1, a shaping mechanism made up of the horizontal die 101, the rotator 102, and the motor 104 is moved up and down in one piece by an air-cylinder 106 supported by a body frame 105. Accordingly, when the dough f is introduced into the dough-shaping apparatus 100, the shaping mechanism in whole is caused to rise to be retreated, and upon positioning of the dough f being made at a predetermined position, the shaping mechanism in whole is caused to fall to thereby execute a shaping operation as previously described. Upon completion of the shaping operation, the shaping mechanism in whole is again caused to rise to be thereby retreated.

Figure 23:
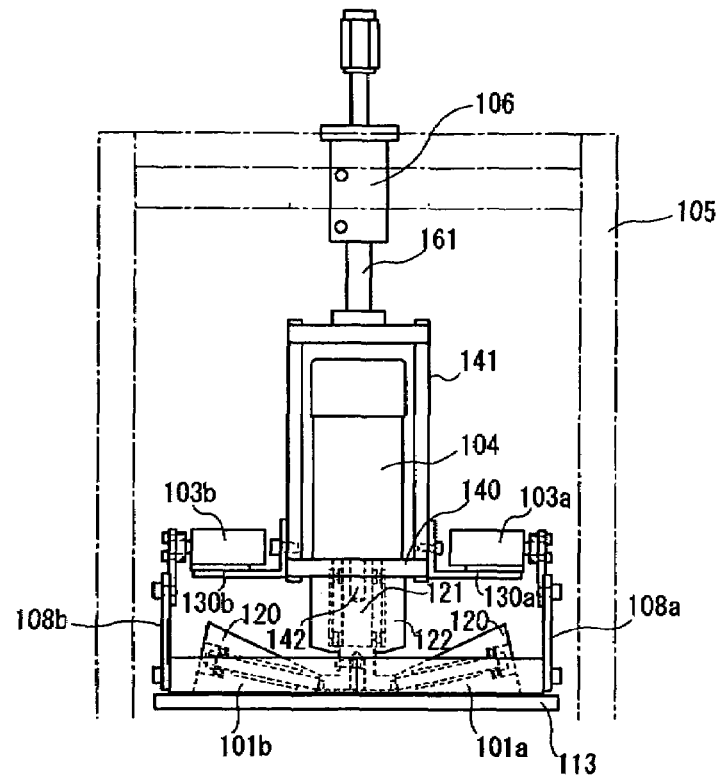
FIG. 23 is a front elevation showing a dough-shaping apparatus according to the embodiment of the invention.
Figure 24:
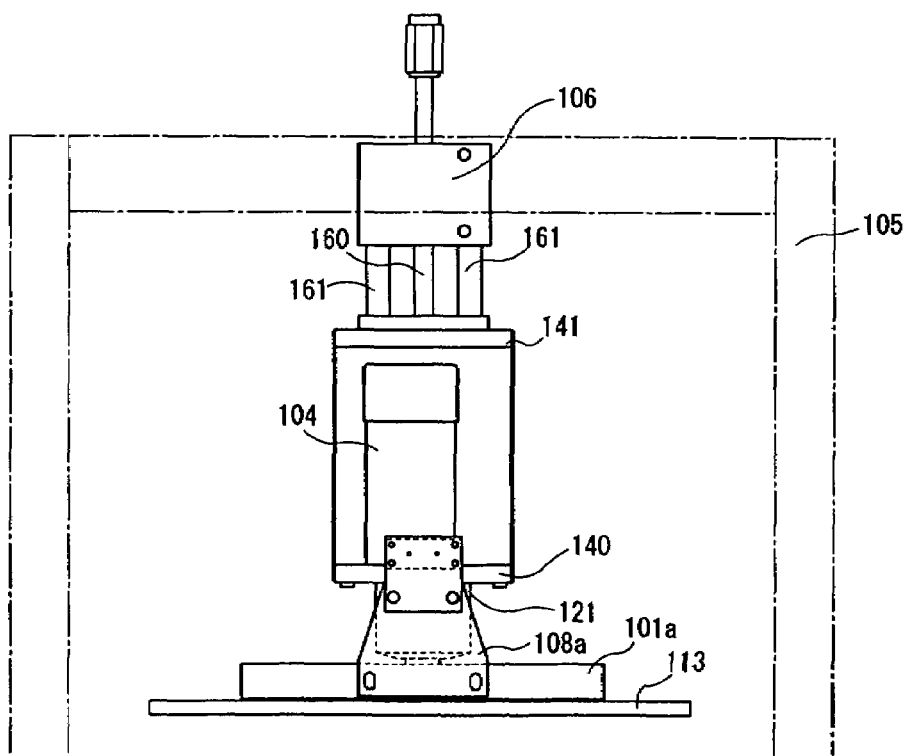
FIG. 24 is a side view showing the dough-shaping apparatus.

FIG. 23 is a front elevation showing the shaping mechanism, and FIG. 24 is a side view showing the shaping mechanism. The body frame 105 is indicated by a dash and dotted line for greater clarity in structure. The motor 104 is installed on a support base 140 to be fixed thereto, and the drive shaft 142 is disposed so as to pass downward through a through-hole provided in the support base 140. A support frame 141 in a shape resembling the letter U as seen from the front thereof is erected on the support base 140 to be fixed thereto, and support sheets 103a, 103b with the air-cylinders 103a, 103b, disposed thereon, respectively, are fixedly attached to the left and right sides of the support frame 141, respectively. The air-cylinders 103a, 103b are disposed on the support sheets 103a, 103b, respectively, such that respective drive shafts of the air-cylinders 103a, 103b undergo an advance-retract motion in the horizontal direction. Attachment plates 108a, 108b are fixedly attached to the drive shafts of the air-cylinders 103a, 103b, respectively, in such a way as to be hung downward, and the die-pieces 101a, 101b are fixedly attached to respective lower ends of the attachment plates 108a, 108b so as to be extended horizontally.

Figure 25:
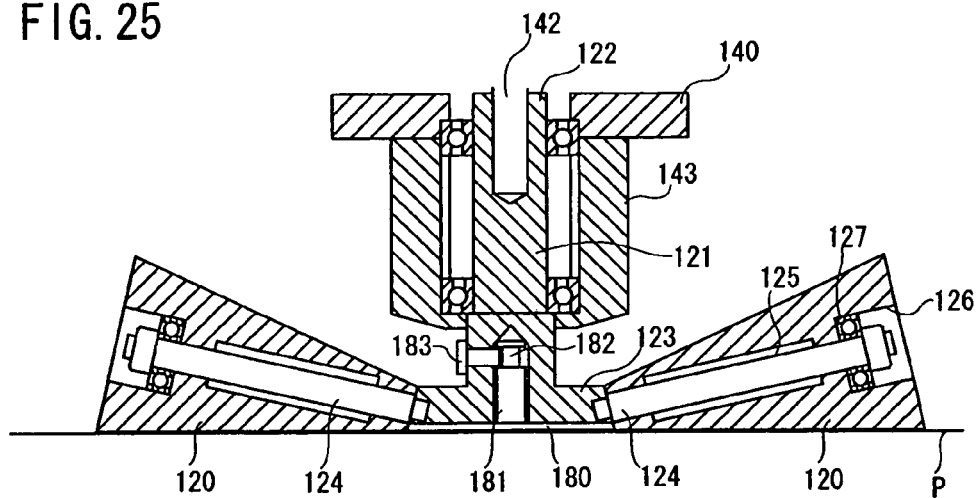
FIG. 25 is a schematic sectional view showing the internal structure of a rotator.

FIG. 25 is a schematic sectional view showing the internal structure of the rotator 102. The drive axle 142 of the motor 104 is inserted in, and fixed to a fixture hole bored in the upper part of the rotating fixture axle 121 of the rotator 102, and the rotating fixture axle 121 is rotatably fitted in a holding cylinder 143 provided on the underside of the support base 140 via bearings. A flange 123 in a saucer-like shape is formed at the lower end of the rotating fixture axle 121, and 12 lengths of roller axles 124 are radially attached and fixed to the outer periphery of the flange 123, at angular intervals of every 30°. Further, the push-roller 120 in the shape of a circular truncated cone is fitted onto the respective roller axles 124. An axle hole 125 into which the roller axle 124 is inserted is bored in the central parts of the respective push-rollers 120, an attachment hole 126 larger in diameter than the axle hole 125 is formed at an end of the push-roller 120, larger in diameter, and bearings 127 are fitted into the attachment hole 126 before a nut 128 is screwed to an end of the roller axle 124. Accordingly, the respective push-rollers 120 are installed so as to be rotatable around the roller axle 124.

An insertion hole 129 extending along a rotation axis from the bottom of the flange 123 is bored in the lower part of the rotating fixture axle 121, and a fixture axle 181 of a pressing disc 180 is inserted into the insertion hole 129. The pressing disc 180 is a flat plate formed so as to be substantially identical in shape to the bottom of the flange 123. The fixture axle 181 is installed such that the lower end thereof is erected at the center of the pressing disc 180, and the upper end thereof is provided with a groove 182 of a predetermined width, formed in the circumferential direction. A tip of a bolt 183 screwed into a screw hole horizontally bored in the rotating fixture axle 121 is engaged with the groove 182. Accordingly, there is no possibility of the fixture axle 181 slipping out of the insertion hole 129, and the fixture axle 181 can be fitted so as to be freely rotatable in the rotating direction of the rotating fixture axle 121.

In a state where the respective push-rollers 120 fitted onto the respective roller axles 124, the lowermost parts of the respective push-rollers 120 are radially arranged so as to be in contact with an action face P substantially parallel with a plane passing along the bottom of the flange 123, and the pressing disc 180 is installed such that the underside thereof also substantially coincides with the action face P. Consequently, the respective roller axles 124 are tilted upward so as to match the shapes of the respective push-rollers 120 to be thereby attached to the flange 123.

Figure 26:
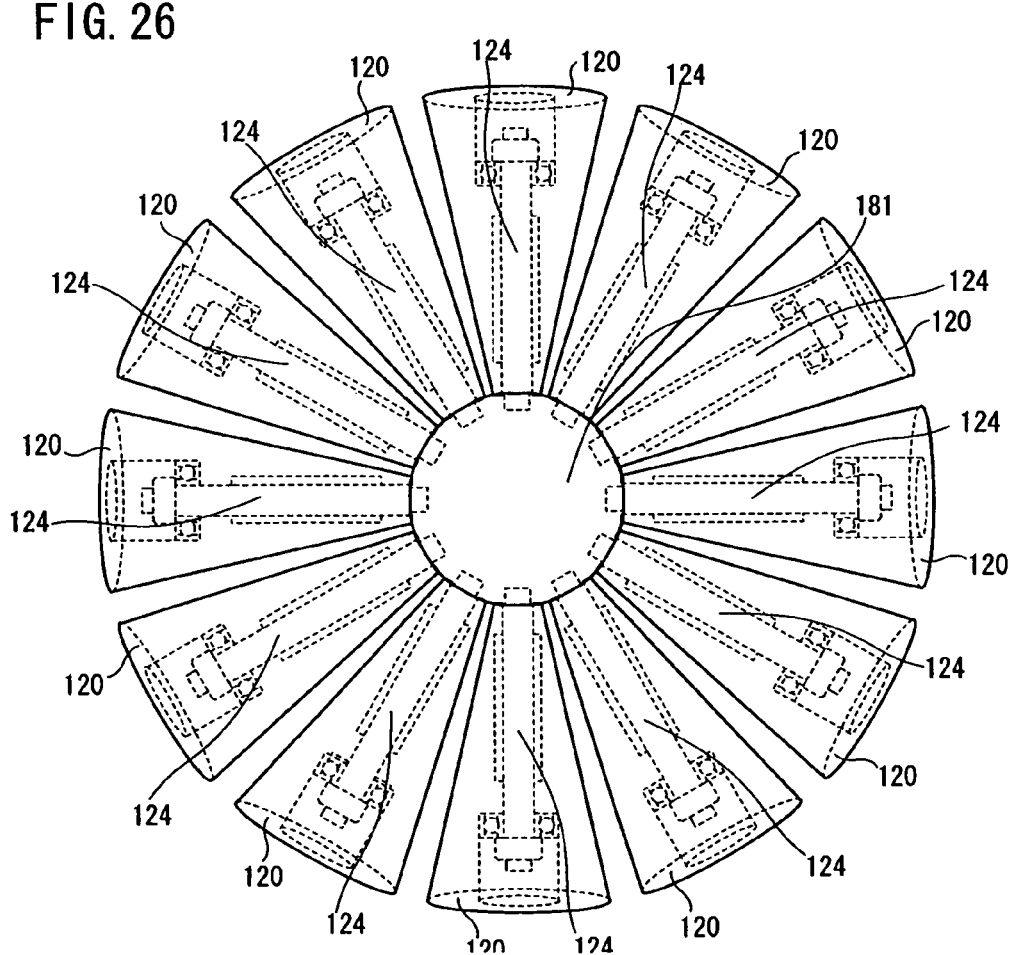
FIG. 26 is a bottom view of the rotator.

FIG. 26 is a bottom view of the rotator 102. The respective push-rollers 120 are attached to the rotator 102 in such a way as to radially extend from a rotation center of the rotating fixture axle 121, and upon rotation of the rotating fixture axle 121, the respective push-rollers 120 come to rotatively reciprocate centering around the respective rotating fixture axles 121. The respective push-rollers 120 in such a state as pressed by the dough come to rotate around the respective roller axles 124 subsequently to a rotatively reciprocating motion thereof. Further, since the pressing disc 180 is attached to the rotating fixture axle 121 so as to be freely rotatable, the pressing disc 180 in such a state as pressed by the dough comes to be in a standstill state even while the rotating fixture axle 121 undergoes rotation.

A drive shaft 160 of the air-cylinder 106, and a pair of guides 161 are fixedly attached to the top of the support frame 141, and the air-cylinder 106 is installed in the top face part of the body frame 105. Accordingly, if the air-cylinder 106 causes the drive shaft 160 to make an advance-retract motion to thereby undergo a vertical motion, this will cause the shaping mechanism made up of the horizontal die 101, the rotator 102, and the motor 104 to make a vertical motion. The advance-retract motion caused by the air-cylinder 106 is adjusted such that an adequate gap is set between the top face of the belt conveyor 112 on top of the fixed base 113, and the action face P at an action position of the shaping mechanism that has come down.

Figure 27:
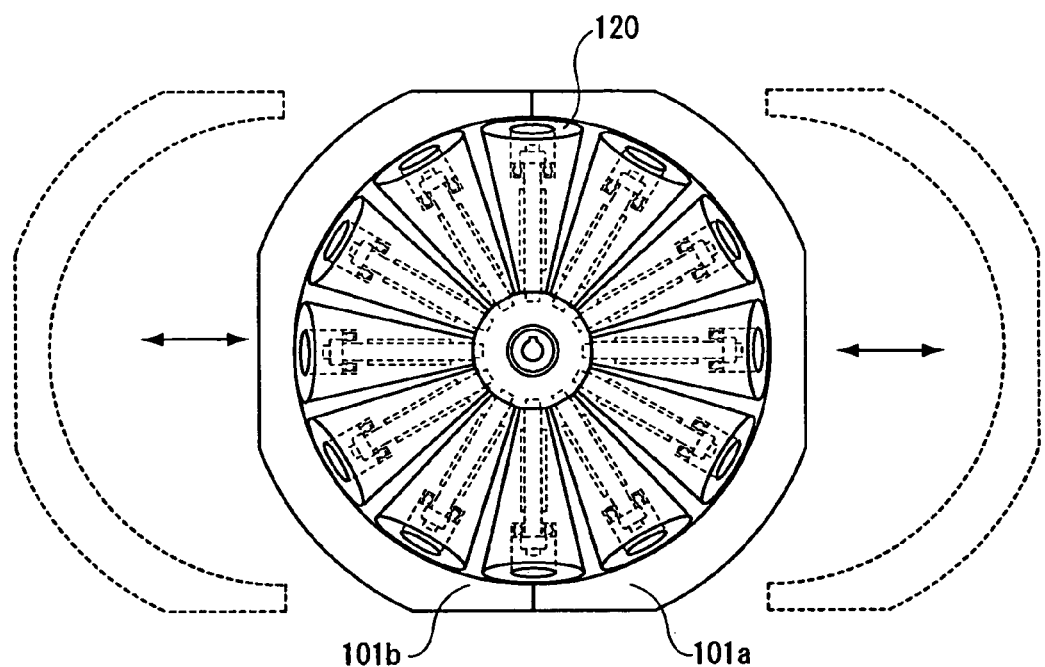
FIG. 27 is a top plan view showing a positional relationship between push-rollers and a horizontal die.
Figure 28:
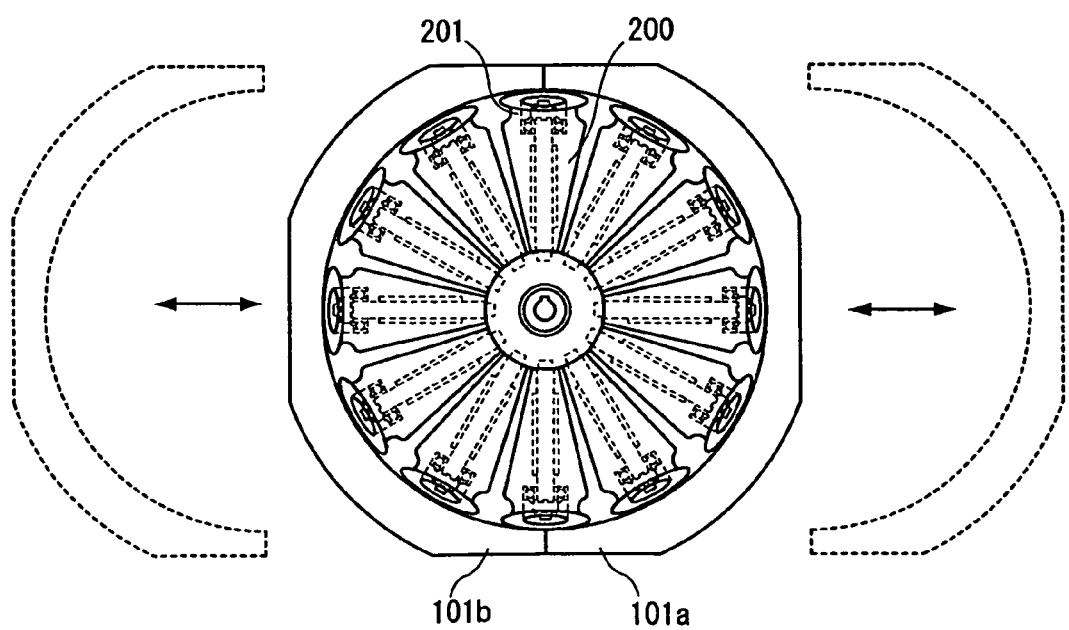
FIG. 28 is a top plan view showing a positional relationship between other push-rollers and the horizontal die.

FIGS. 27, and 28 are top plan views each showing positional relationship between the push-rollers 120, and the die-pieces 101a, 101b of the horizontal die 101. In FIG. 27, there are shown the respective push-rollers 120 in the shape of the circular truncated cone for use in shaping dough into a thin sheet-like shape, and in FIG. 28, there are shown push-rollers 200 each in the shape of a circular truncated cone with the periphery of a large-diameter end thereof, being curved so as to be recessed, thereby forming a groove 201, suitable for use in shaping dough into a so-called Neapolitan type dough with swelling on the periphery thereof. The die-pieces 101a, 101b are disposed such that respective inner peripheral faces thereof come to be in contact with respective peripheral ends of the large-diameter ends of the respective push-rollers 120, and when the respective push-rollers 120 rotatively reciprocate upon the rotation of the rotating fixture axle 121, there occurs no gap between the horizontal die 101, and the respective push-rollers 120 to thereby prevent the dough from being leaked therebetween. In the case of the push-rollers 200, the die-pieces 101a, 101b are similarly disposed such that respective inner peripheral faces thereof come to be in contact with respective peripheral ends of the large-diameter ends of the respective push-rollers 200 to thereby prevent the dough from being leaked therebetween.

In replacing the push-roller 120 with the push-roller 200, it need only be sufficient to remove the nut 128 screwed to the roller axle 124 to thereby pull the push-roller 120 out of the roller axle 124, and to fit the push-roller 200 in place of the push-roller 120 onto the roller axle 124, so that a replacement work can be easily executed. Further, since the horizontal die 101 is attached to the air-cylinders 103a, 103b through the intermediary of the attachment plates 108a, 108b, respectively, the horizontal die 101 can be easily removed for replacement according to the size of dough to thereby enable the dough to be shaped to a wide variety of sizes. In addition, dough thickness can be easily adjusted by adjusting the action position of the shaping mechanism that has come down due to the advance-retract motion caused by the air-cylinder 106.

FIG. 29 is a schematic representation showing a shaping process by the shaping mechanism using the push-roller 200. First, in FIG. 29A, the shaping mechanism is at a retreat position after rising, and the die-pieces 101a, 101b of the horizontal die 101 are set to be at respective positions widely spaced from each other as a result of respective actions of the air-cylinders 103a, 103b. The dough f that has been spread into a flat sheet-like shape by the dough-thinning apparatus 1 is transferred by the belt conveyor 112 to be thereby positioned under the rotator 102. At this point in time, the center of the dough f is preferably set so as to substantially coincide with the center of rotation of the rotating fixture axle 121.

Figure 29A:
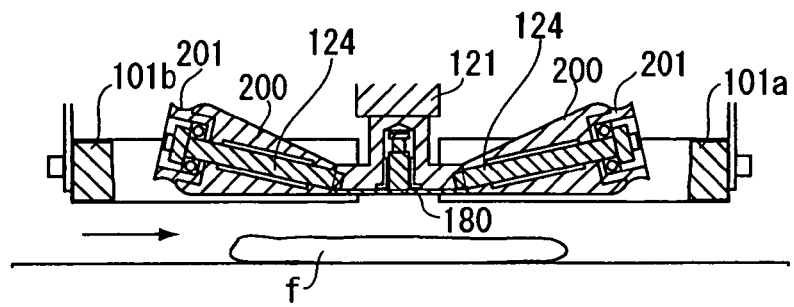
FIGS. 29A to 29E are schematic representations showing respective steps of a shaping process by a shaping mechanism using the push-roller.
Figure 29B:
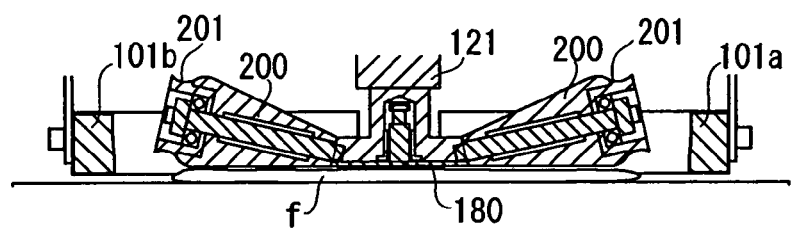
Figure 29C:
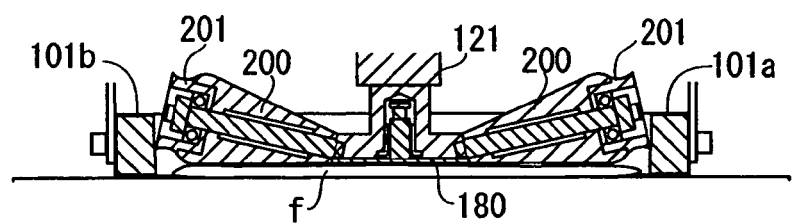

Once the positioning of the dough f is made and the air-cylinder 106 comes into action to thereby cause the shaping mechanism to keep coming down, whereupon the lowermost parts of the respective push-rollers 200, and the pressing disc 180 come to be in contact with the top face of the dough f, and upon the shaping mechanism further coming down lower, a portion of the dough, opposite to the pressing disc 180, comes to be pushed outwards, so that with the respective push-rollers 200, the dough is pushed out therebetween (FIG. 29B). Then, upon the shaping mechanism coming down to the action position thereof, the air-cylinders 103a, 103b are caused to act with the bottoms of the die-pieces 101a, 101b being pressed onto the top face of the belt conveyor 112, thereby causing the die-pieces 101a, 101b to approach each other so as to be in a state shown in FIG. 28. In this state, the respective inner peripheral faces of the die-pieces 101a, 101b are in contact with the respective peripheral ends of the large-diameter ends of the respective push-rollers 200. Further, it is set such that a predetermined gap is provided between the top face of the belt conveyor 112, and the action face P coinciding with the lowermost parts of the respective push-rollers 200, and the bottom of the pressing disc 180 (FIG. 29C).

Figure 29D:
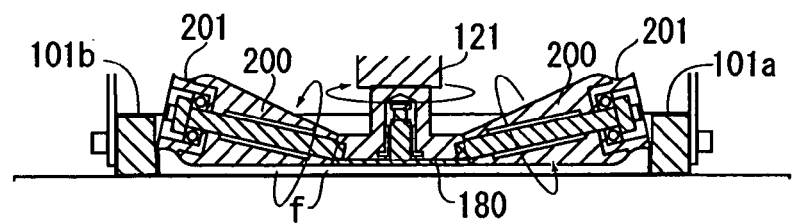

When the motor 104 set at the action position of the shaping mechanism is driven for rotation, the rotating fixture axle 121 is rotated to thereby cause the respective push-rollers 200 to rotatively reciprocate around the respective rotating fixture axles 121. As the respective push-rollers 200 in such a state as pressed to the dough make a rotatively reciprocating motion, the respective push-rollers 200 come to rotate around the roller axles 124 subsequently to the rotatively reciprocating motion. Hence, the dough pushed out between the respective push-rollers 200 is pushed and rolled to be thereby spread outwards. In this case, the pressing disc 180 in the state as pressed by the dough remains in a standstill state without undergoing rotation together with the rotating fixture axle 121. Then, as the dough is kept pushed and rolled by the respective push-rollers 200, the dough spread outwards comes to be pushed out as far as a region surrounded by the grooves 201 formed around the respective peripheries of the large-diameter ends of the respective push-rollers 200, the belt conveyor 112, and the respective inner peripheral faces of the die-pieces 101a, 101b (FIG. 29D).

Figure 29E:
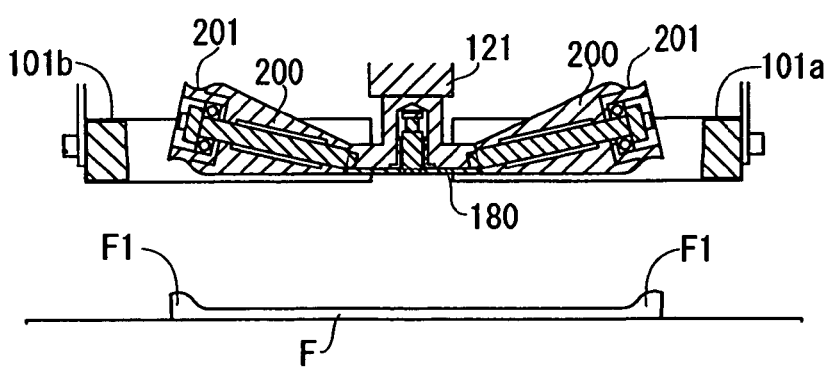

After rotating the rotator 102 a predetermined number of times, the air-cylinders 103a, 103b are caused to come into action to thereby move the die-pieces 101a, 101b to the respective positions widely spaced from each other, and the air-cylinder 106 is actuated to thereby cause the shaping mechanism to move up to the retreat position (FIG. 29E). With a shaped dough F, a peripheral edge F1 formed so as to have swelling on the periphery of the shaped dough F, larger in thickness, will be shaped so as to have a predetermined width. Further, inner parts of the shaped dough F will be shaped so as to be uniform in thickness. As to rotation of the rotator 102, after rotating the rotator 102 in one direction the predetermined number of times, the rotator 102 may be rotated in an opposite direction the predetermined number of times, and a rotation method can be altered as appropriate according to the characteristics of the dough.

As described hereinbefore, with the use of the dough-shaping apparatus for foodstuff, according to the invention, dough in a variety of shapes can be shaped. Further, the number of lengths as well as the shape of the push-rollers to be installed may be altered so as to match the characteristics of dough, and shapes to be formed, and by replacing the push-rollers with push-rollers in length corresponding to the size of dough to be shaped, and by replacing the horizontal die with a horizontal die corresponding in size to the dough to be replaced, an alteration work matching the size of the dough to be shaped can be easily executed.

Figure 30A:
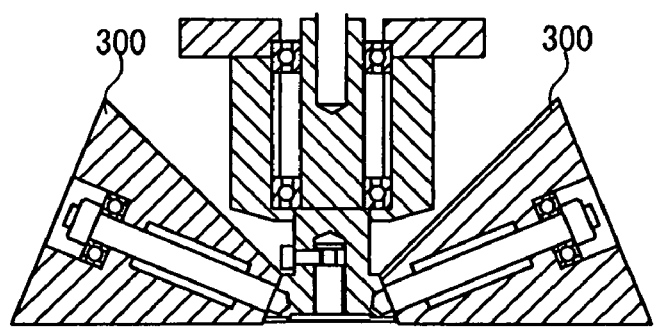
FIGS. 30A and 30B are sectional view showing variations of the push-roller, respectively.
Figure 30B:
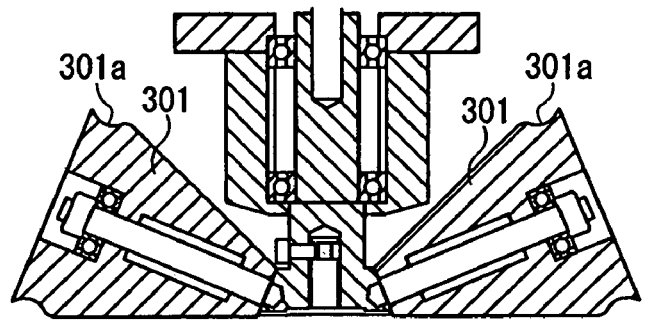
Figure 31:
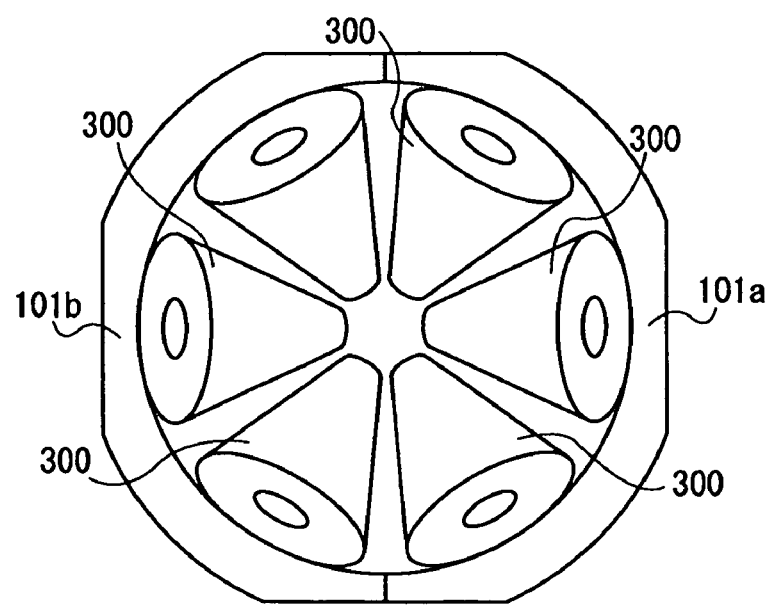
FIG. 31 is a top plan view showing an array of the push-rollers shown in FIG. 29.

In FIGS. 30 and 31, there is shown an example of a push-roller in the shape of a circular truncated cone, with a large-diameter end thereof, increased in size. With this example, FIG. 30A shows a push-roller 300 which is normal without a recess, and FIG. 30B shows a push-roller 301 with a recess 301a formed on the outer periphery of a large-diameter end thereof. FIG. 31 shows an example where six lengths of the push-rollers 300 shown in FIG. 30A are arrayed and the number of lengths of the push-rollers as arrayed can be reduced because of an increase in size of the large-diameter ends of the respective push-rollers 300.

Figure 32A:
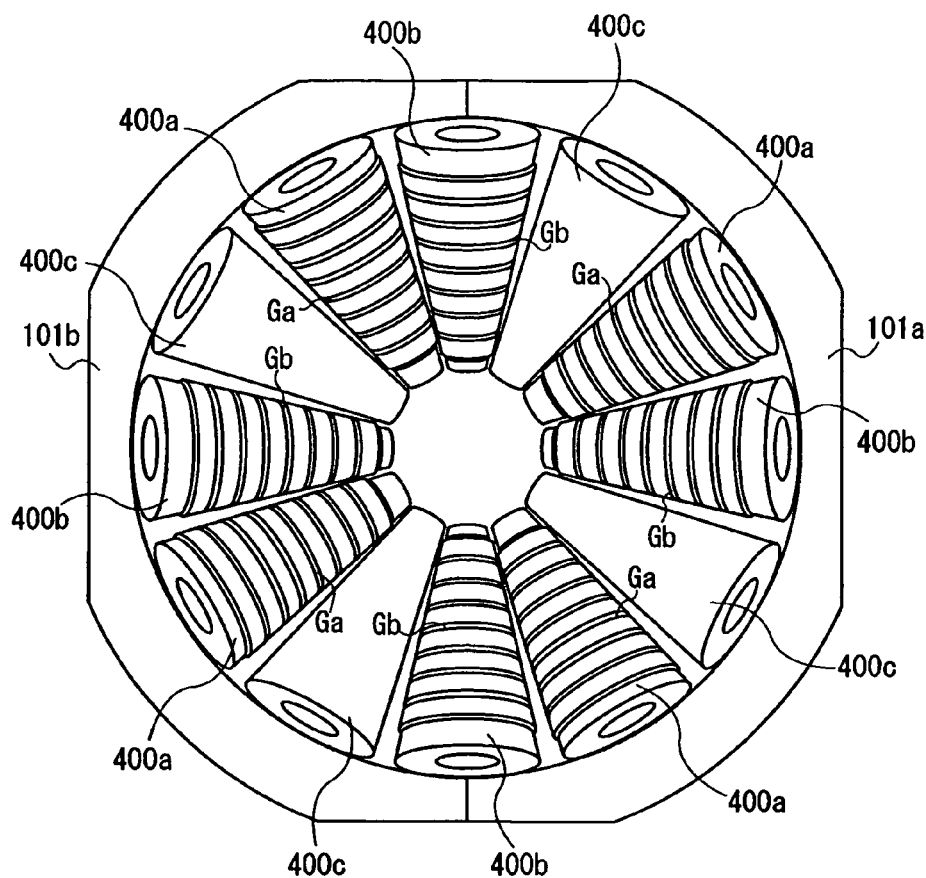
FIG. 32A is a top plan view concerning push-rollers with grooves formed thereon.
Figure 32B:
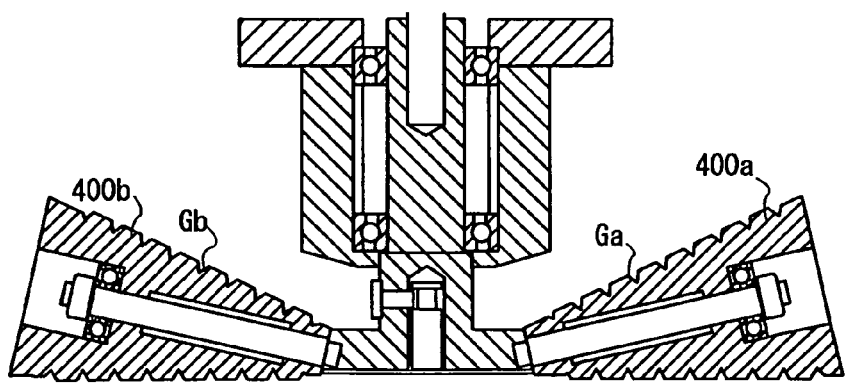
FIG. 32B is a sectional view thereof.
Figure 33A:
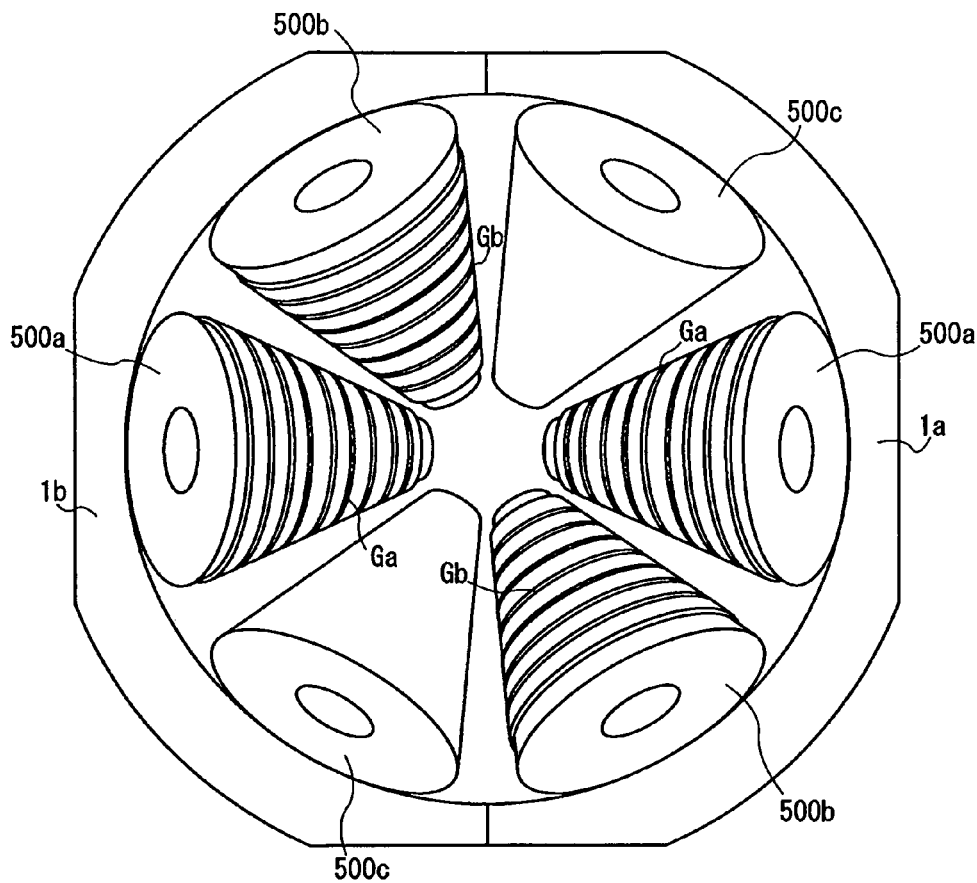
FIG. 33A is a top plan view concerning push-rollers with other grooves formed thereon.
Figure 33B:
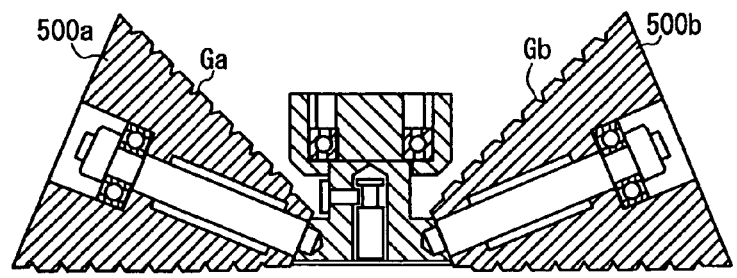
FIG. 33B is a sectional view thereof.

FIGS. 32 and 33 each show an example where grooves are formed across the whole peripheral surface of a push-roller. In FIGS. 32A and 32B, there are provided 12 lengths of push-rollers, of which, 4 pairs of the push-rollers 400a, 400b have grooves Ga, Gb, formed thereon, respectively. The respective pairs of the push-rollers 400a, 400b comprise 2 lengths of the push-rollers adjacent to each other, and the grooves Ga, Gb each are a plurality of grooves formed in a circular shape, engraved across the whole peripheral surface of each of the push-rollers. The push-rollers 400a, 400b are set to be slightly larger in diameter than each of the push-rollers 400c without grooves formed thereon, the grooves Ga, Gb each are wedge-like in sectional shape, and parts of the push-rollers 400a, 400b, corresponding to the respective bottoms of the grooves Ga, Gb, are set to be slightly smaller in diameter than parts of the push-roller 400c, corresponding to the equivalent parts of the push-rollers 400a, 400b. Further, the respective grooves Ga formed on the push-roller 400a are set to be positioned between the grooves Gb adjacent to each other, formed on the push-roller 400b so that the grooves Ga, Gb are prevented from duplicatively acting on the dough.

Thus, by forming a plurality of grooves at predetermined intervals across the whole peripheral surfaces of at least a pair of rollers adjacent to each other, and by setting the respective groves on one of the rollers so as to be disposed between the adjacent grooves on the other roller, it becomes possible to cause the grooves formed on the pair of the rollers, respectively, to act on the dough without overlapping one another, thereby enabling more of the grooves to act on the dough.

The formation of the grooves has an effect of spreading the dough in the radial direction from the center of rotation of the rotating fixture axle 121 when the push-rollers 400a, 400b rotatively reciprocate. More specifically, when the dough is spread by a portion of the peripheral surface, between the adjacent grooves Ga, the dough is spread so as to gather toward the respective grooves Ga to be thereby spread in the radial direction. Subsequently, the push-roller 400b acts in such a way as to crush a portion of the dough, swelled after gathering at the respective grooves Ga, whereupon the dough swells at the respective grooves Gb, and in turn, the push-roller 400a acts on a portion of the dough, thus swelled, so that the push-rollers 400a, 400b alternately spread the dough in the radial direction, and the respective push-rollers 400c without the grooves thereon, rotatively reciprocate to thereby act so as to flatten the surface of the dough. An operation for pressing and spreading the dough can be efficiently executed in this way In FIGS. 33A and 33B, there are provided 6 lengths of push-rollers, of which, 2 pairs of the push-rollers 500a, 500b have grooves Ga, Gb, formed thereon, respectively. With this example, large-diameter ends of the respective push-rollers are set to be larger in size that those for the example shown in FIG. 32. The grooves Ga, Gb are formed similarly to those shown in FIG. 32, and an efficient operation for pressing and spreading the dough can be similarly executed.

Figure 34:
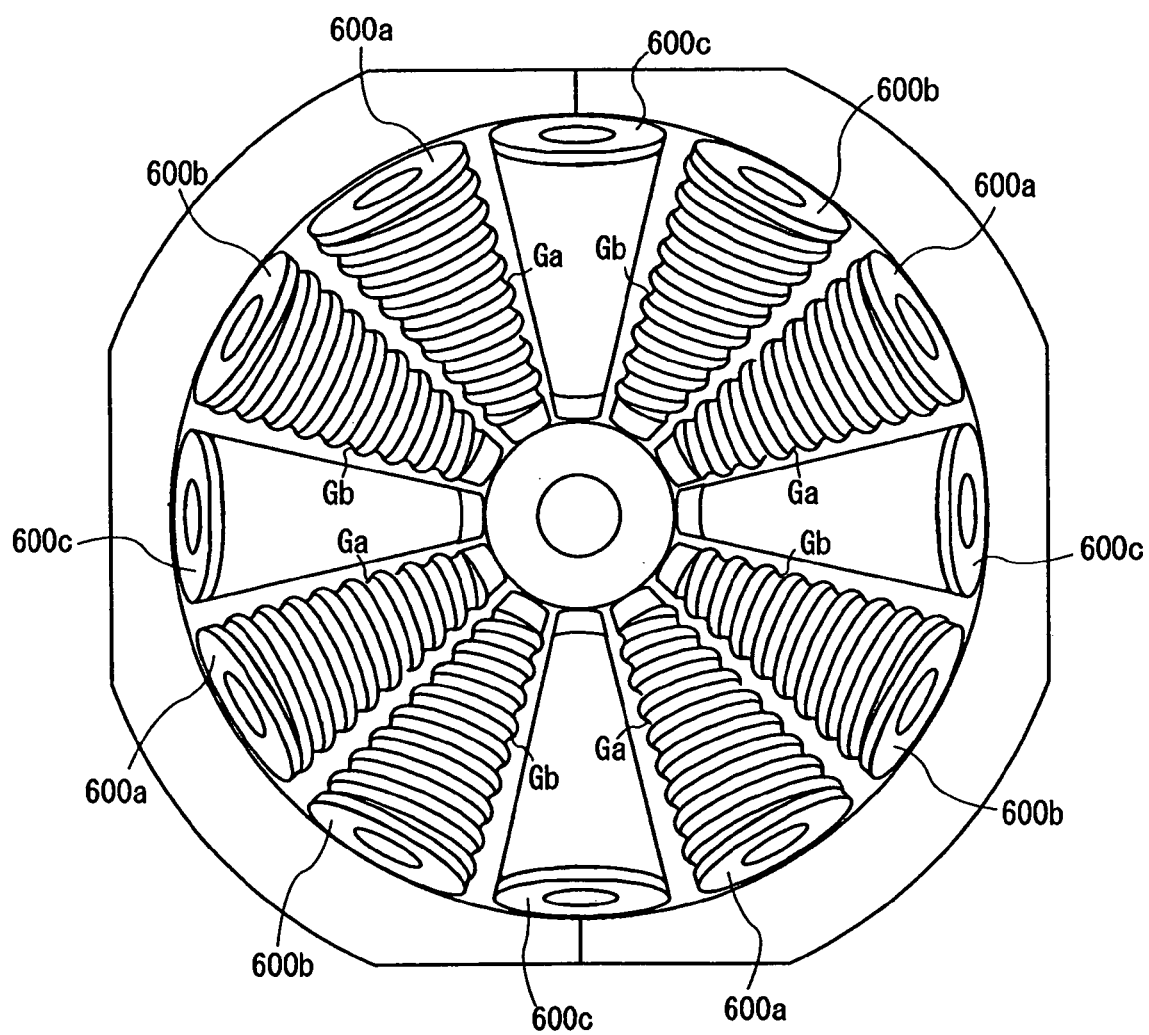
FIG. 34 is a top plan view concerning push-rollers with different grooves formed thereon.

FIG. 34 shows an example where spiral grooves are formed across the whole peripheral surface of each of push-rollers. There are provided 12 lengths of push-rollers, of which, 4 pairs of the push-rollers 600a, 600b have spiral grooves Ga, Gb, formed thereon, respectively. The respective pairs of the push-rollers 600a, 600b comprise 2 lengths of the push-rollers adjacent to each other, and the spiral grooves Ga, Gb each are formed in a spiral shape, across the whole peripheral surface of each of the push-rollers, being engraved so as to be right-hand wound, and left-hand wound, respectively. The push-rollers 600a, 600b are set to be slightly larger in diameter than each of the push-rollers 600c without grooves formed thereon, the spiral grooves Ga, Gb each are curved in sectional shape, and parts of the push-rollers 600a, 600b, corresponding to the respective bottoms of the spiral grooves Ga, Gb, are set to be slightly smaller in diameter than parts of the push-roller 600c, corresponding to the equivalent parts of the push-rollers 600a, 600b.

Figure 35:
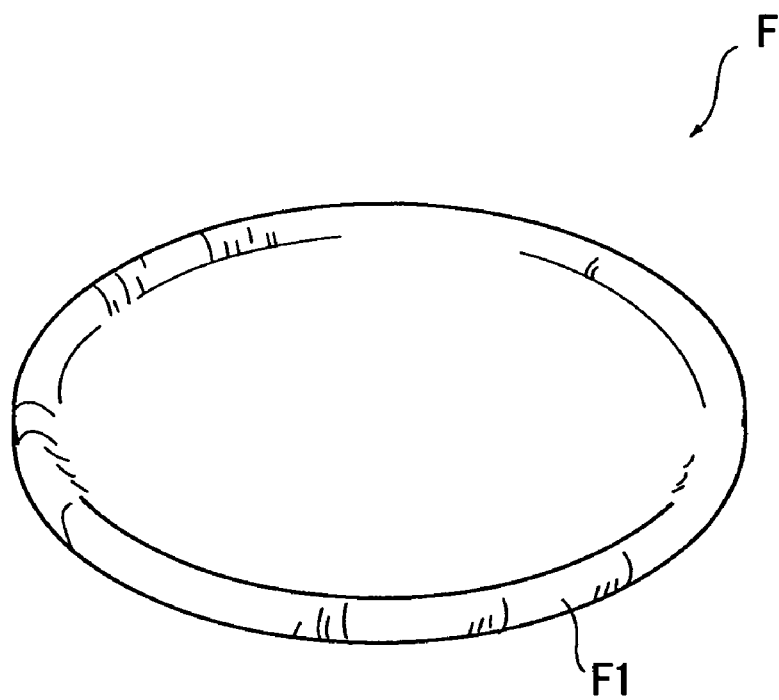
FIG. 35 is a pictorial view of a shaped dough.
Figure 36:
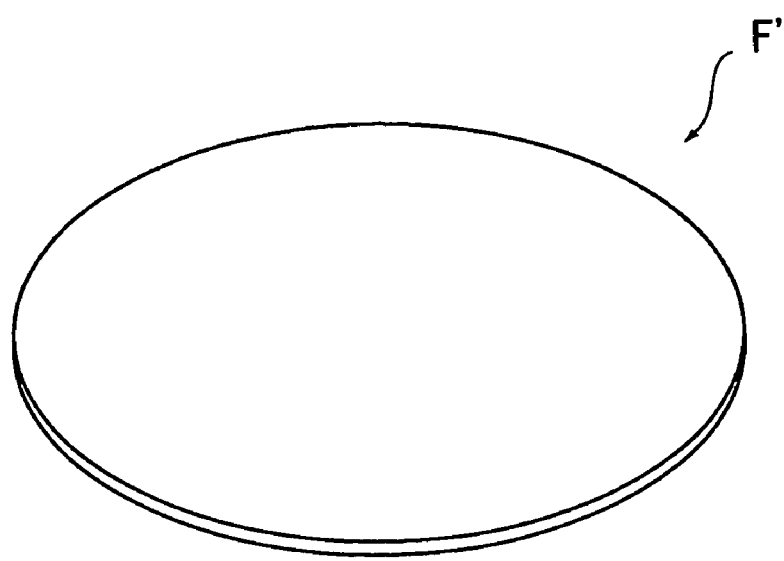
FIG. 36 is a pictorial view of another shaped dough.

FIG. 35 shows a shaped dough F for Neapolitan pizza. A peripheral edge F1 formed so as to have swelling on the periphery of the shaped dough F, larger in thickness, is finished up so as to have a predetermined width, and uniform thickness. FIG. 36 shows dough F' for thin sheet-like Italian pizza, shaped by the push-rollers 120, which can be finished up to a small thickness. The dough-shaping apparatus can also be used for shaping a thin dough for baked bread besides the pizza dough, such as tortilla of Mexican food, and nun of Indian food.

Figure 37A:
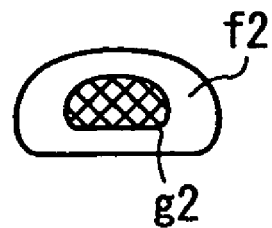
FIGS. 37A and 37B are sectional views concerning dough with different inner materials wrapped therein, respectively.
Figure 37B:
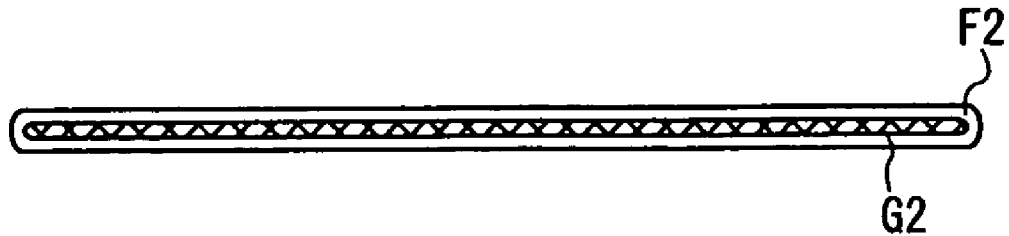
Figure 38:
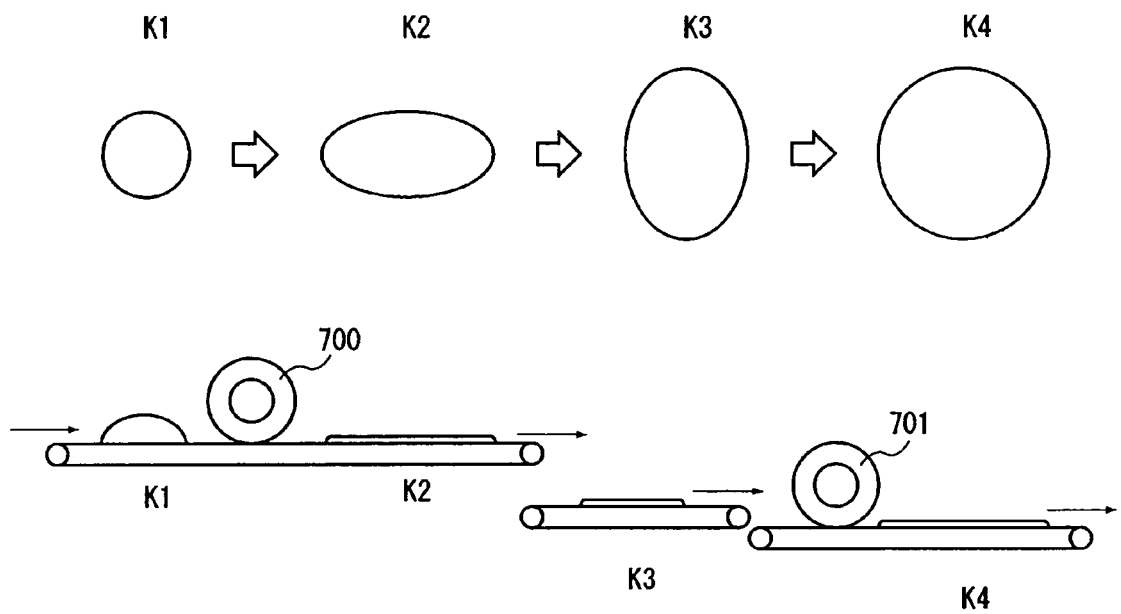
FIG. 38 is a schematic representation showing a conventional dough-beating apparatus.
Figure 39:
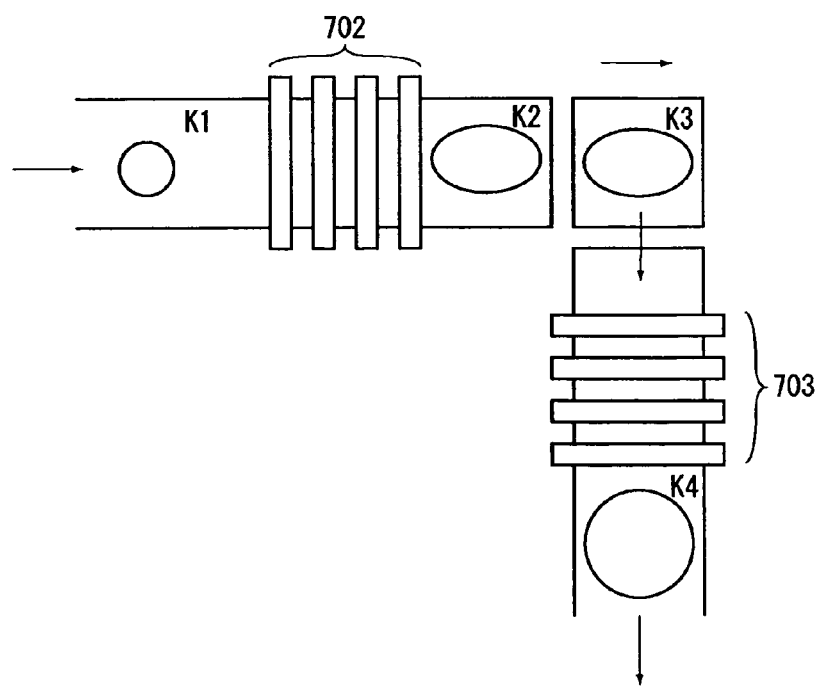
FIG. 39 is a schematic representation showing another of the conventional dough-beating apparatus.

Further, as shown in FIG. 37, besides the above-described, if dough f2 made of flour wrapping up an inner material g2 such as bean paste, and pepper paste is prepared (FIG. 37A) to be then rolled by use of the dough-shaping apparatus according to the invention, this will enable a thin dough with the inner material g2 wrapped up to be finished up. In this case, as shown in FIG. 37B, it is possible to shape the dough f2 into a thinly rolled dough F2 in which an inner material G2 in whole is formed in a thin layer.

The dough processing apparatus according to the invention is capable of thinning dough made of various materials, besides the pizza dough, bread dough, described as above, such as dough using flour (weak flour, strong flour), and dough made of a mixture of flour, and rice powders, and so forth, and can be applied for wide-ranging purposes.

What is claimed is:

1. A dough-shaping apparatus comprising:
   a horizontal die for surrounding the periphery of dough placed over a support body;
   a rotator provided with rollers rotatably fitted onto a plurality of axles radially extended around a support part, respectively;
   a positioning means for determining respective positions of the rotator, and the horizontal die so that the rollers are disposed in close proximity to an inner peripheral face of the horizontal die; and
   a drive means for driving the rotator in rotation so that the rollers rotatively reciprocate along the inner peripheral face of the horizontal die;
   wherein a bottom of the support part of the rotator is formed in a planar shape, and the rollers are set to be rotated on a plane along the bottom.

2. A dough-shaping apparatus according to claim 1, wherein the bottom is provided with a flat plate formed so as to be freely rotatable around the rotation axis of the rotator.

3. A dough-shaping apparatus according to claim 1, wherein the rollers each are formed in the shape of a circular truncated cone with a diameter thereof, increasing along an outward direction extending from the support part, and the outermost ends of the rollers, respectively, are butted against the inner peripheral face of the horizontal die.

4. A dough-shaping apparatus according to claim 1, wherein the rollers each are provided with a curved face recessed toward the respective rotation center axes of the rollers, formed on the periphery of the outermost ends thereof.

5. A dough-shaping apparatus according to claim 1, wherein a plurality of grooves are formed across the whole peripheral surface of at least part of the rollers.

* * * * *